(12) United States Patent
Ogikubo et al.

(10) Patent No.: US 7,646,134 B2
(45) Date of Patent: Jan. 12, 2010

(54) SMALL THIN FILM-MOVABLE ELEMENT, SMALL THIN FILM-MOVABLE ELEMENT ARRAY AND IMAGE FORMING APPARATUS

(75) Inventors: Shinya Ogikubo, Kanagawa (JP); Hirochika Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 571 days.

(21) Appl. No.: 11/482,730

(22) Filed: Jul. 10, 2006

(65) Prior Publication Data
US 2007/0007849 A1  Jan. 11, 2007

(30) Foreign Application Priority Data
Jul. 8, 2005  (JP)  ............ P 2005-200367

(51) Int. Cl.
*H01L 41/08* (2006.01)
(52) U.S. Cl. .................................. 310/309
(58) Field of Classification Search ........... 310/328, 310/330–332, 317, 309
See application file for complete search history.

(56) References Cited
U.S. PATENT DOCUMENTS

| | | | | |
|---|---|---|---|---|
| 4,553,061 A | * | 11/1985 | Germano | 310/332 |
| 5,093,600 A | * | 3/1992 | Kohl | 310/332 |
| 5,138,216 A | * | 8/1992 | Woodruff et al. | 310/316.01 |
| 5,666,258 A | * | 9/1997 | Gevatter et al. | 361/207 |
| 6,483,056 B2 | * | 11/2002 | Hyman et al. | 200/181 |
| 6,504,118 B2 | * | 1/2003 | Hyman et al. | 200/181 |
| 7,202,591 B2 | * | 4/2007 | Arbogast et al. | 310/332 |
| 2008/0297903 A1 | * | 12/2008 | An et al. | 359/579 |
| 2009/0026880 A1 | * | 1/2009 | Liu | 310/309 |

FOREIGN PATENT DOCUMENTS

| | | |
|---|---|---|
| JP | 02-007014 | 1/1990 |
| JP | 08-334709 | 12/1996 |
| JP | 2001-174720 | 6/2001 |
| JP | 2001-242395 | 9/2001 |
| JP | 2002-036197 | 2/2002 |
| JP | 2002-169109 | 6/2002 |

* cited by examiner

*Primary Examiner*—Mark Budd
(74) *Attorney, Agent, or Firm*—Sughrue Mion, PLLC

(57) ABSTRACT

A small thin film-movable element is provided and includes: a movable portion supported elastically deformably and capable of being displaced bidirectionally in one direction and a direction reverse thereto; a first drive source for applying a physical acting force to the movable portion, in which the movable portion produces a modulating or switching function by the first drive source; and a second drive source, which is different from the first drive source, for increasing or reducing an absolute value of the physical acting force to restrain a vibration of the movable portion in driving to displace the movable portion in a first direction by the first drive source.

16 Claims, 25 Drawing Sheets

P-P SECTION

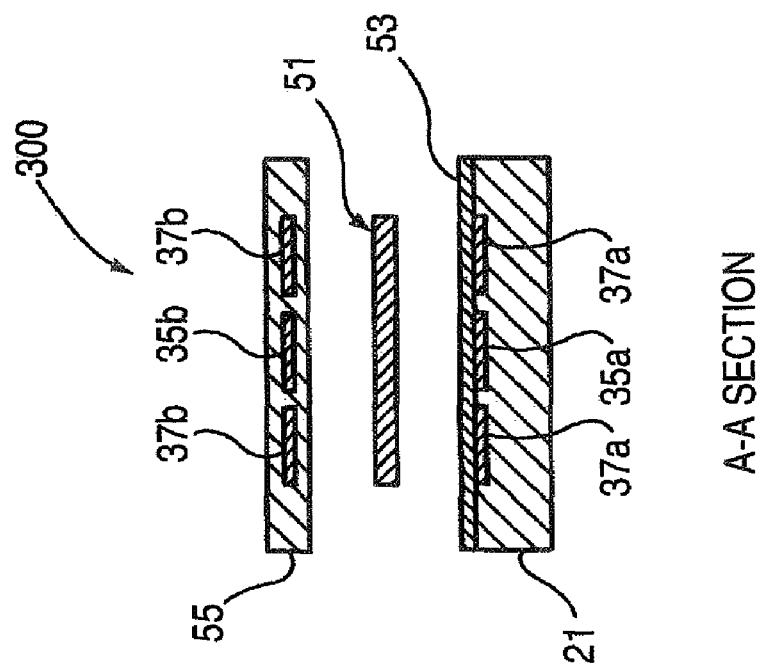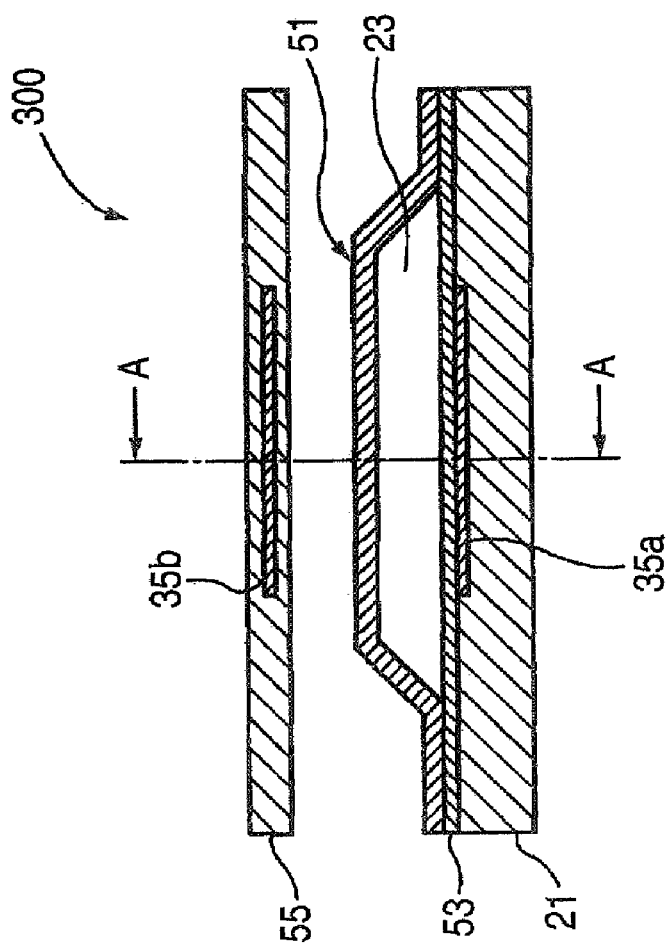
FIG. 14A
FIG. 14B
A-A SECTION

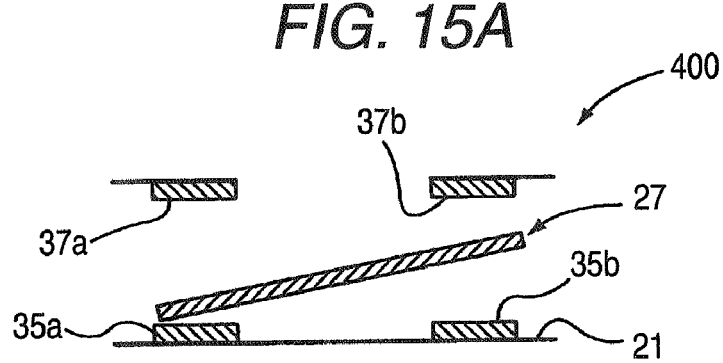
FIG. 15A
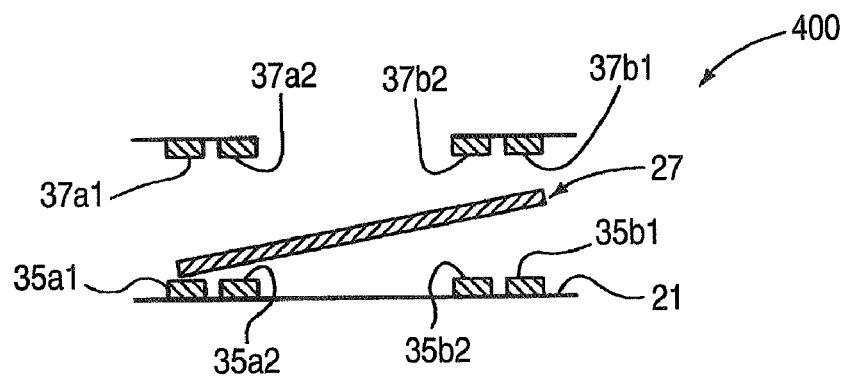
FIG. 15B
FIG. 16
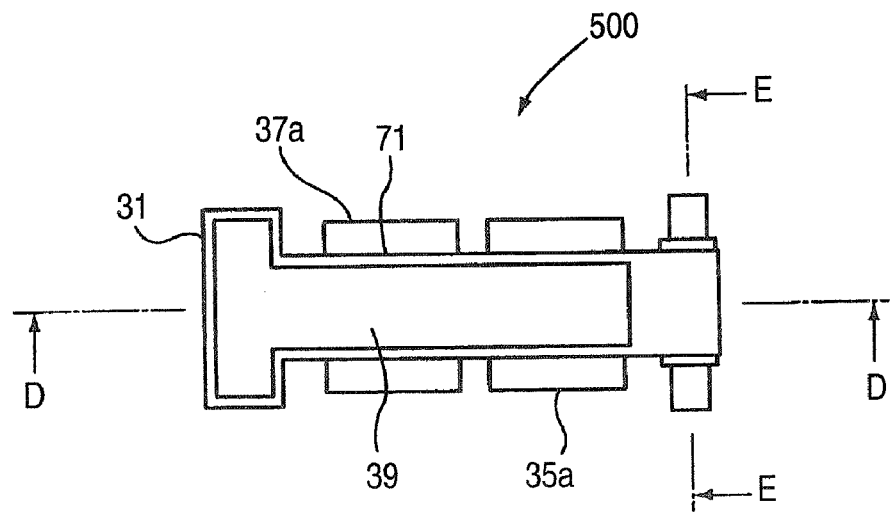

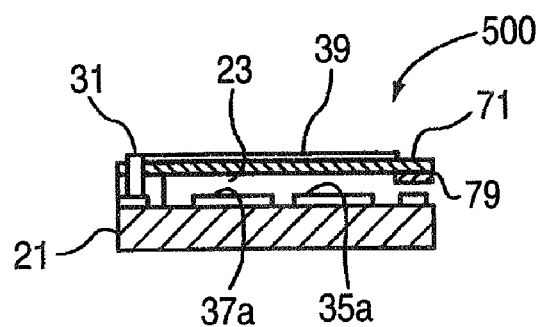
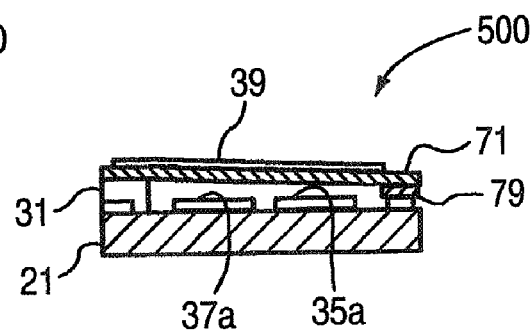
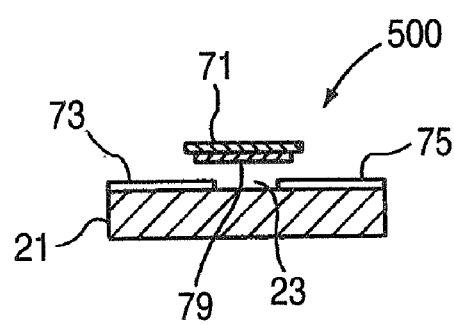
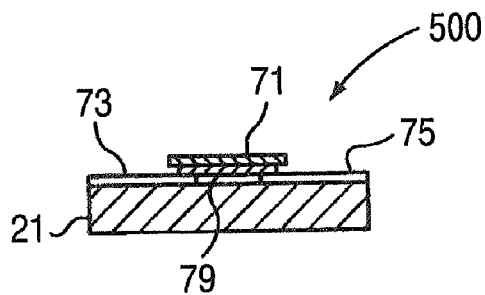
E-E SECTION　　　　　　E-E SECTION

FIG. 27A
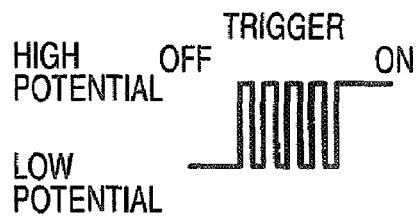
FIG. 27B
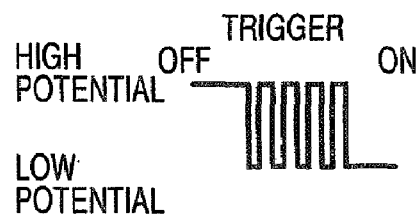
FIG. 27C
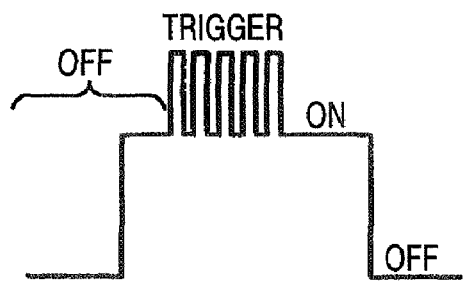
FIG. 27D
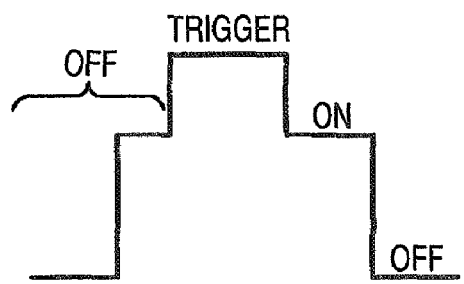
FIG. 27E
FIG. 27F
FIG. 27G
FIG. 27H

FIG. 28
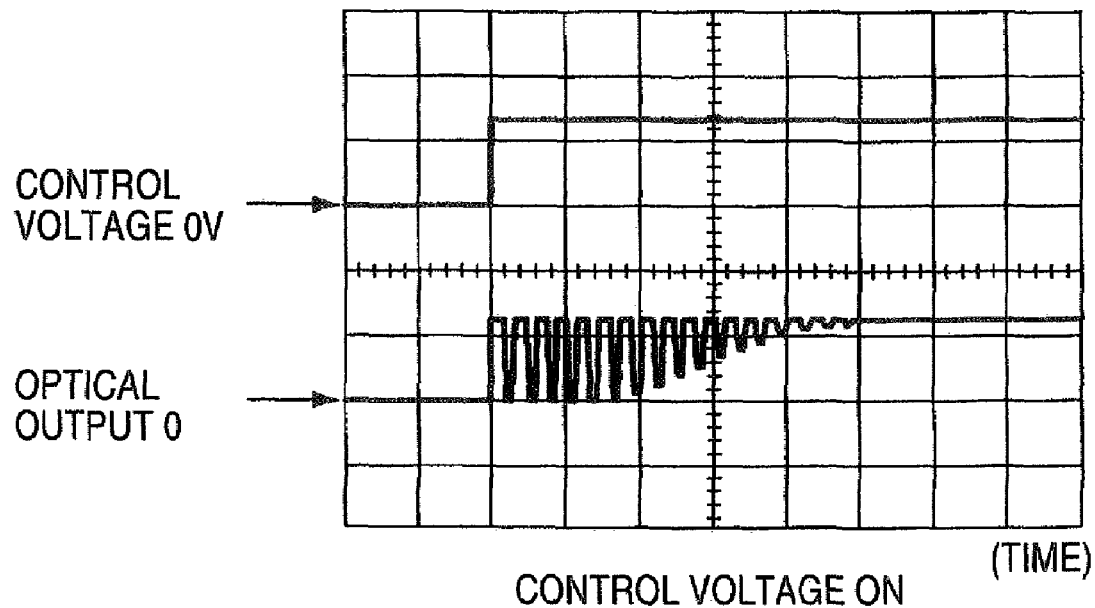
CONTROL VOLTAGE ON (TIME)
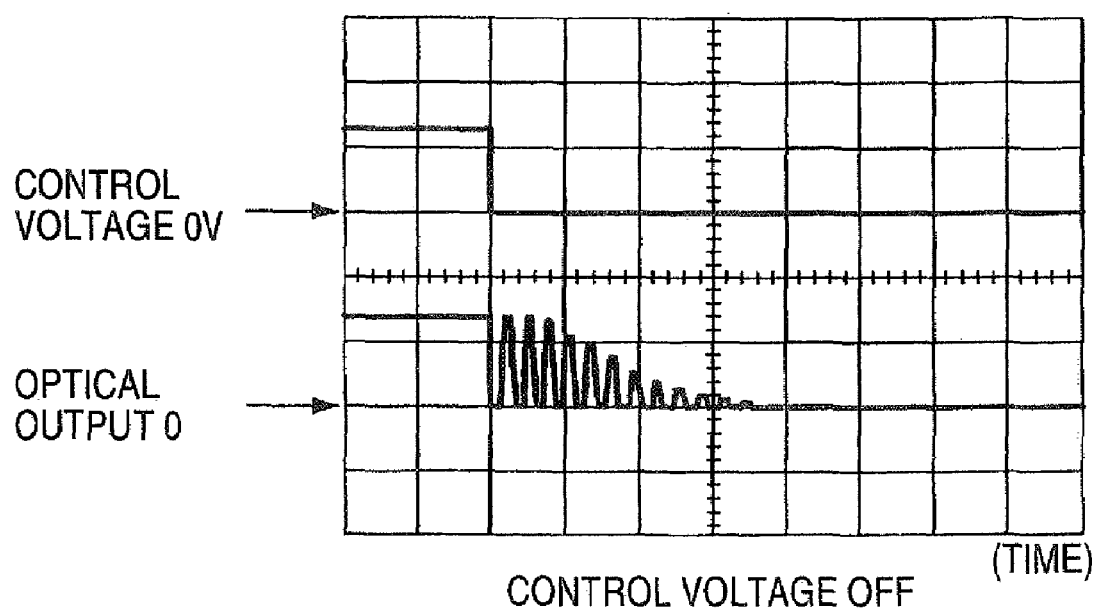
CONTROL VOLTAGE OFF (TIME)

SMALL THIN FILM-MOVABLE ELEMENT, SMALL THIN FILM-MOVABLE ELEMENT ARRAY AND IMAGE FORMING APPARATUS

FIELD OF THE INVENTION

The present invention relates to a small thin film-movable element and a small thin film-movable element array as well as an image forming apparatus preferably used in, for example, optical communication, an exposing apparatus, a projector, an optical switch, a scanner, an RF switch, an actuator, a multiplexer and the like.

BACKGROUND OF THE INVENTION

In recent years, by rapid progress of an MEMS technology (Micro-Electro Mechanical systems), a development of a small thin film-movable element for electrically displacing or moving a small thin film of μm order has intensively been carried out. As the small thin film-movable element, there is, for example, a digital micromirror device (DMD) for deflecting light by inclining a micromirror, an optical switch for switching an optical path or the like. DMD has a wide use in a field of an optical information processing such as a projecting display, a video monitor, a graphic monitor, a television set and electrophotography printing and so on. Further, an optical switch is expected to be applied to optical communication, optical interconnection (signal connecting technology by light such as an intercoupling network in parallel computers), an optical information processing (information processing by optical operation) and the like.

Generally, a small thin film-movable element includes a movable portion elastically deformably supported and capable of being displaced one-dimensionally or two-dimensionally, and the movable portion mainly deals with switching operation. Therefore, it is particularly important to control the braking of the movable portion in excellently carrying out the switching operation.

For example, a micromirror apparatus disclosed in JP-A-8-334709 is constructed by a constitution of applying a voltage to one electrode of a pair of drive electrodes and rotating a movable portion having a mirror arranged between the electrodes by hinge connection by an electrostatic attractive force in accordance with a potential difference and an electrostatic capacitance between the movable portion and the drive electrodes.

Further, according to a method of attenuating a ribbon element in a small mechanical lattice apparatus disclosed in JP-A-2001-174720, in a method of determining a bottom surface and attenuating an electromechanical ribbon element above a channel having a bottom conductive layer formed below the bottom surface, there are a step of providing at least one constant amplitude voltage pulse to at least one ribbon element, and a step of providing a brake pulse divided from the constant amplitude voltage pulse by a narrow temporary gap to at least one ribbon element. That is, the electrostatic force is operated in a single direction by one movable portion electrode of a parallel flat plate system element and one fixed electrode, and vibration is controlled by two of brake drive voltages of a drive voltage for attracting the ribbon element to a side of a lower electrode, and an initial brake voltage applied immediately before the drive voltage, or a final brake voltage applied immediately after the drive voltage.

Further, an optical path switching apparatus disclosed in JP-A-2002-169109 includes a mechanical optical switch for switching an optical path by applying a signal voltage to an electromagnetically driven actuator, and a control circuit for supplying the signal voltage to the optical switch. According to the signal voltage, with regard to a rise amplitude VH and a signal width T of the signal, a voltage after an elapse of T/2 from rise of the signal is equal to or smaller than ⅔ VH. Further, vibration is intended to restrict by reducing the signal voltage equal to or smaller than ⅔ times as much as a rise amplitude when T/2 has elapsed from rise of the signal of the signal width T in the signal voltage applied to the actuator.

Further, a method of controlling a micromachine element disclosed JP-A-2002-36197 is constituted such that a first control signal and a second control signal are supplied to the micromachine element, the second control signal sets the micromachine element to an active state, and the first control signal maintain the state. Further, the micromachine element is controlled by using at least two of control signals of a control signal for setting the micromachine element to a pull-in state and other control signal for maintaining the micromachine element to the pull-in state. Thereby, the micromachine element can be controlled at a low voltage level.

Further, according to a method of controlling to switch an optical switch disclosed in JP-A-2-7014, in an optical switch including a vibrating member displaced by making a control voltage ON, OFF, and an element provided at a front end of the vibrating member for reflecting or cutting propagated light by displacing the optical element, before making the control voltage ON, a first preliminary voltage pulse shorter than a period of a natural frequency of the vibrating member is applied to the vibrating member, after making the control voltage OFF, a second preliminary voltage pulse shorter than the period of the natural frequency of the vibrating member is applied to the vibrating member.

Generally, in an optical switch, when a vibrating member is displaced by making a control voltage ON, OFF, a phenomenon referred to as chattering is brought about. The chattering is a phenomenon in which after making a control voltage ON or OFF, the vibrating member is not changed immediately by an amount of displacement in correspondence with the control voltage but is displaced finally by the amount of displacement in correspondence with the control voltage while carrying out a large attenuating vibration. Therefore, until an optical output becomes a constant level by attenuating the vibration, an optical path is not switched and a speed of switching the optical switch is restricted. In contrast thereto, according to the method of controlling to switch the optical switch by the background art, by applying the preliminary voltage pulse shorter than the period of the natural frequency of the vibrating member before making the control voltage ON and after making the control voltage OFF, chattering is controlled and the speed of switching optical switch is increased.

Further, according to a small electromechanical modulating element disclosed in JP-A-2001-242395, there is provided a small electromechanical modulating element array capable of actively reducing a vibration of a movable portion to achieve high speed formation of switching operation.

However, according to the micromirror apparatus disclosed in JP-A-8-334709, the voltage is applied to one of the drive electrodes, the electrostatic attractive force in accordance with the potential difference and the electrostatic capacitance between the movable portion and the drive electrodes is generated to thereby rotate the movable portion. Therefore, as shown by FIG. 24A, a vibration is generated by receiving a repulsive force from a contact member immediately after the micromirror is moved to a contact position to be grounded on the contact position by applying a voltage Va. Further, even in a case of a noncontact structure in which the micromirror is not grounded on the control position, as shown by FIG. 24B, a time period is required until converging the vibration by bringing about overshoot by exceeding a desired rotational angle (converging position). The vibration or the overshoot hampers high speed formation in switching operation of the small thin movable element.

Further, according to the small mechanical lattice apparatus disclosed in Patent JP-A-2001-174720, as shown by FIG. 25A, a constant amplitude voltage pulse 1 is a function of time and is provided with a duration time period of 2 μsec and a voltage value of 10 V. Immediately after the constant amplitude voltage pulse 1, a narrow brake pulse 5 divided from the constant amplitude voltage pulse 1 by a narrow gap 3 is applied. Further, when constant amplitude voltage pulses 7 contiguous to each other are provided with inverse polarities as shown by FIG. 25B, also a polarity of the brake pulse 9 becomes inverse to that of the voltage 7 related thereto. However, the small mechanical lattice apparatus is a small thin film-movable element of a so-to-speak parallel flat plate type for displacing the ribbon constituting the movable portion to a side of a board in parallel therewith, a pulse is applied to one movable portion side electrode and one fixed electrode opposed thereto to brake and therefore, there is a disadvantage of being devoid of a variety in the vibration control method. For example, when the movable portion is displaced by being attracted to the board, a brake force in a reverse direction cannot simultaneously be applied. That is, vibration cannot actively be reduced.

Further, according to the optical path switching apparatus disclosed in JP-A-2002-169109, in the electromagnetically driven actuator, when the movable portion becomes proximate to a front end of a yoke, that is, when an attractive force by a magnetic field of a permanent magnet becomes intensive, an attractive force by a magnetic field of a coil is reduced and the movable portion is moved to a position of connecting a fiber such that a synthesized attractive force does not become excessively strong. A waveform outputted by a signal generating circuit is a signal voltage in which the voltage rises by a rise voltage VH=7 V and is thereafter rapidly dropped as shown by FIG. 26A. The signal width T is 5 ms, and a voltage at a terminal end of the signal is 0.5 V. A voltage after an elapse of T/2 from rise is 0.8V. In FIG. 26B, a rise voltage is 7 V, the signal width T is 5 ms, and a time period To of changing the amplitude in a step-like shape=1.5 ms. In FIG. 26C, the rise voltage is 5 V and the time period T until the reduced amplitude becomes 1 V=2 ms. The time period T corresponds to the signal width. The voltage of 1 V is continued to be applied until carrying out next switch after the time period T. FIG. 26D shows a waveform in which the rise voltage is 5 V, the time period To until the step-like amplitude is changed=3 ms and the amplitude is changed in the step-like shape by a constant value 0.5 V. The signal voltages can restrain chattering by accelerating movement (switching speed) of the movable portion by increasing the amplitude of rise and reducing a force applied to the movable portion by rapidly reducing the signal voltage when the movable portion is started to move. However, although according to the optical switching apparatus, a block constituting the movable portion is bidirectionally being displaced in parallel, the vibration is intended to be restrained by changing the drive force operated in a forward direction and therefore, there is a disadvantage of being devoid of a variety in the vibration control method. Further, basically, the attractive force by the magnetic field of the coil is reduced, the signal voltage is reduced such that the synthesized attractive force does not become excessively strong, similar to the above-described, vibration cannot actively be reduced.

Further, according to the method of controlling the micromachine element disclosed in JP-A-2002-36197, the control is carried out by using a single or a plurality of control signals. Typical waveforms of the control signals are shown by FIGS. 27A to 27H. As is known from FIGS. 27A and 27B, the control signal may be constituted by a pulse row for changing the state of the micromachine element. Similarly, in the case of at least two control signals, the signals may be signals synthesized in superposed signals drawn in FIGS. 27C and 27D, an amplitude modulating (AM) signal shown in FIG. 27E, a frequency modulating (FM) signal shown in FIG. 27F, a pulse width modulating (PWM) signal drawn in FIG. 27G, or a pulse density modulating (PDM) signal drawn in FIG. 27H. However, according to the control method, an object of control is constituted by reducing a voltage maintained in the pull-in state, reducing ON/OFF delay by discharging residual charge, increasing the amplitudes of the output signal and the like, and vibration cannot actively be reduced.

Further, according to the method of controlling to switch optical switches disclosed in JP-A-2-7014, as shown by FIG. 28, before making the control voltage ON, OFF, the first preliminary voltage pulse, the second preliminary voltage pulse are applied to the vibrating member, the electrostatic force is operated in a signal direction by one movable portion electrode and one fixed electrode, and vibration in driving the movable portion is restrained by a balance of an elastic force and an inertia force of a movable support portion, the electrostatic force (potential difference) only in the forward direction of being operated in the movable transiting direction is changed and therefore, an effect of restraining vibration is small. Generally, in an optical switch for optical communication, different from DMD, much time period is taken until converging free vibration for being positioned at an arbitrary angle. Further, optical information of laser light or the like is reflected to be incident on a fiber on an emitting side and therefore, a high control accuracy is requested, vibration of the movable portion (mirror portion) constitutes a cause of noise as the above-described chattering. In this way, particularly in the case of the optical switch, the influence of vibration is larger than that of DMD, which is desired to be improved.

Further, the small electromechanical modulating element disclosed in JP-A-2001-242395 comprises a mirror 13 attached to a yoke 12 by a mirror support post, a mirror address electrode 14, a yoke address electrode 15, and a catch electrode 16. According to the small electromechanical modulating element, the catch electrode 16 is provided at a pertinent height position above a surface of the element to be proximate to a continuous end portion of the mirror 13 or the yoke 12 when the mirror 13 is rotated in a desired angle region. The catch electrode 16 and the mirror assembly generate an extremely high electrostatic attractive force therebetween, and when the mirror becomes proximate to a plane of the catch electrode, the mirror is biased to stop the mirror 13. Therefore, by controlling pulse waveform of the mirror assembly, the mirror 13 is firmly attenuated, and vibration of the DMD mirror is prevented when the mirror assembly is stopped at a desired rotation angle. However, the small electromechanical modulating element is provided with a drawback that an effect of restraining vibration is small since vibration is intended to restrain by noncontact drive. Particularly, the catch electrode 16 for restraining vibration of the yoke 12 in being operated by a physical acting force is arranged on a plane the same as that of the yoke 12, and is braked by a physical acting force between end faces thereof and therefore, areas of the electrodes opposed to each other are small, a large physical acting force is not achieved and an efficiency of restraining vibration is poor.

SUMMARY OF THE INVENTION

An object of an illustrative, non-limiting embodiment of the invention is to provide a small thin film-movable element and a small thin film-movable element array as well as an image forming apparatus capable of restraining a variety of vibrations and capable of reducing a vibration generated when a movable portion reaches a final position to thereby achieve high speed formation of operating the small thin film-movable element. Also, the invention is not required to provide the advantages described above, and an illustrative, non-limiting embodiment of the invention may provide different advantages.

The above-described object according to the invention can be achieved by the following constitutions.

(1) A small thin film-movable element characterized in including: a movable portion supported elastically deformably and capable of being displaced bidirectionally in a first direction and a direction reverse thereto (a second direction); a first drive source for applying a physical acting force to the movable portion so that the movable portion performs a modulating or switching function; and a second drive source, which is different from the first drive source, for increasing and/or reducing an absolute value of the physical acting force to restrain a vibration of the movable portion in driving to displace the movable portion in a first direction by the first drive source.

According to the small thin film-movable element, when the physical acting force is operated in a direction reverse to a transition (moving) direction of the movable portion, the movable portion immediately before being brought into contact with the stopping member is decelerated, it is prevented that the movable portion reaches a finally displaced position by a large speed as in the background art, or a displacement in a direction reverse to the transition direction of the movable portion by a repulsive force after having been brought into contact with the stopping member is restrained, and the vibration of the movable portion is actively reduced.

(2) The small thin film-movable element according to (1), characterized in that the physical acting force is applied to the movable portion in the first direction by the second drive source after the movable portion is driven to be displaced in the first direction and during a time period in which the movable portion is transiting (moving) in a second direction different from the first direction.

According to the small thin film-movable element, by applying the physical acting force in the first direction to the movable portion after the movable portion is driven to displace in the first direction to reach a final position of the displacement and there is a time period in which the movable portion is transiting in the second direction by a repulsive force or an elastic force by being brought into contact with the stopping member, movement of the movable portion which is going to be separated from the final position of the displacement is actively braked.

(3) The small thin film-movable element according to (1) or (2), characterized in that the physical acting force is applied to a plurality of points of action in the movable portion.

According to the small thin film-movable element, by constituting the plurality of operating points, for example, in the movable portion of a pivoting type constituting a center of rotation by a center thereof, the physical acting force is applied to both sides interposing the center of rotation. Thereby, brake forces having different magnitudes are applied to the respective points of action by different timings to achieve a variety of vibration restraining effects.

(4) The small thin film-movable element according to any one of (1) to (3), characterized in that a speed of the movable portion is substantially nullified when the movable portion reaches a final position of a displacement in a specific direction (one of the first and second directions).

According to the small thin film-movable element, the speed of the movable portion at an instance of reaching the finally displaced position is substantially nullified, and there is not brought about a vibration by an impact produced when the movable portion of the background art reaches the finally displaced position by the large speed, or overshoot when the movable portion of the background art reaches the finally displaced position when the movable portion of the background art is driven in noncontact.

(5) The small thin film-movable element according to any one of (1) to (4), characterized in that both of the physical acting force for displacing the movable portion in the first direction and the physical acting force for displacing the movable portion in the second direction by the first and the second drive sources are electrostatic forces.

According to the small thin film-movable element, by constituting the physical acting force for displacing the movable portion by the electrostatic force, a high speed vibration restraining force is achieved.

(6) The small thin film-movable element according to any one of (1) to (5), characterized in that the physical acting force is applied in a shape of a pulse wave expressed in an ordinate by an intensity of the physical acting force and an abscissa by time.

According to the small thin film-movable element, the physical acting force is generated in a voltage range specified by the pulse waveform to achieve a variety of vibration restraining effects. Further, the pulse waveform in this case includes a rectangular wave, a sine wave, a cosine wave, a saw tooth wave, a triangular wave and a synthesized wave thereof.

(7) The small thin film-movable element according to (6), characterized in that the physical acting force is generated by a plurality of pulse waveforms.

According to the small thin film-movable element, the physical acting forces having different magnitudes are applied by different timings to achieve a variety of vibration restraining effects.

(8) The small thin film-movable element according to any one of (1) to (7), characterized in that two or more of the physical acting forces can be set in respective transition directions of the movable portion (each of the first and second directions).

According to the small thin film-movable element, for example, in the movable portion of a pivoting type constituting a center of rotation by a center thereof, two or more of the physical acting forces are applied to respective one sides of both sides interposing the center of rotation. Thereby, brake forces having different magnitudes are applied to one side of the movable portion by different timings to achieve a variety of vibration restraining effects.

(9) The small thin film-movable element according to any one of (1) to (8), characterized in that when the movable portion reaches the final position of the displacement in the specific direction, the movable portion is stopped by being brought into contact with a stopping member.

According to the small thin movable element, when the movable portion reaches the final position, the movable portion is brought into contact with the stopping member (grounding site) to be stopped thereby. That is, the small thin movable element is operated as a so-to-speck contact type. In this case, although the movable portion receives a repulsive force from the stopping member immediately after having been grounded, the movable portion is braked by the physical acting force to be forcibly damped.

(10) The small thin film-movable element according to any one of (1), to (9), characterized in that the second drive source for applying the physical acting force in a direction reverse to the transition direction of the movable portion is arranged on a side opposed to the first drive source by interposing the movable portion between the first and second drive sources.

According to the small thin film-movable element, the physical acting force is applied to the first drive source and the movable portion, immediately before the movable portion reaches the final position, the physical acting force is applied to the second drive source disposed on a side opposed to the first drive source by interposing the movable portion therebetween and the movable portion, the speed of the movable portion at an instance of reaching the finally displaced position is substantially nullified, and there is not brought about the vibration by the impact produced when the movable portion of the background art reaches the finally displaced position by the large speed, or overshoot when the movable portion of the background art reaches the finally displaced position when the movable portion of the background art is driven in noncontact.

(11) The small thin film-movable element according to any one of (1) to (10), characterized in that at least one of the first and second drive sources is arranged at least at one arranging place for transiting the movable portion in the first direction or the second direction different from the first direction.

According to the small thin film-movable element, by respectively providing singles of pluralities of the first drive sources and the second drive sources in the respective transition directions, for example, in the movable portion of the pivoting type constituting the center of rotation by the center, two or more of electrostatic forces are applied to respective one sides of both sides interposing the center of rotation. Thereby, brake forces having different magnitudes are applied to one side of the movable portion by different timings to achieve a variety of vibration restraining effects.

(12) The small thin film-movable element according to any one of (1) to (11), characterized in that the movable portion is provided with a switching function for optical communication for switching output light of an optical fiber (a first optical fiber) to other arbitrary optical fiber (a second optical fiber).

According to the small thin film-movable element, when used for optical communication, the vibration of the movable portion is restrained and therefore, noise of a transmitting signal can be reduced.

(13) A small thin film-movable element array characterized in being one-dimensionally or two-dimensionally aligned with the small thin film-movable element according to any one of (1) through (12).

According to the small thin film-movable element array, the small thin film-movable elements capable of carrying out high speed switching operation are arrayed, a time period of converging the vibration can be shortened, the address voltage can be written faster than in the background art. Further, by changing the displacement control signals of the individual small thin film-movable elements, a control of correcting the operational error can be carried out.

(14) The small thin film-movable element array according to (13), characterized in that each of the small thin movable elements includes a drive circuit including a memory circuit, one of electrodes provided at the movable portion and at least two fixed portions opposed to the movable portion is a signal electrode inputted with an element displacement signal from the drive circuit and the other of the electrodes is a common electrode.

According to the small thin film-movable element array, by providing the memory circuit, the memory circuit can previously be written with the element displacement signal. Further, by applying the element displacement signal previously written to the memory circuit to the signal electrode simultaneously with applying the constant common electrode similar to that in the background art, a plurality of small thin film-movable elements can actively be driven at high speed.

(15) The small thin film-movable element array according to (13) or (14), characterized in further comprising a control portion for driving to modulate each of the movable portions.

According to the small thin film-movable element array, by controlling to drive the movable portion by the control portion, before the movable portion reaches the finally displaced position, the absolute value of the voltage between the electrodes of the movable electrode and the fixed electrode is reduced or increased, or increased and reduced to thereby enable to restrain vibration or overshoot by impact produced when the movable portion reaches the finally displaced position.

(16) An image forming apparatus characterized in comprising a light source, the small thin film-movable element array according to any one of (13) through (15), an illuminating optical system for irradiating light from the light source to the small thin film-movable element array, and a projecting optical system for projecting light emitted from the small thin film-movable element array to an image forming face.

According to the image forming apparatus, by providing the small thin film-movable element array according to any one of (13) to (15) at a main portion of the constitution, vibration can actively be reduced and in comparison with the apparatus of the background art, a drive cycle (switching operation) is shortened.

According to a small thin film-movable element according to an aspect of the invention, there is provided the second drive source different from the first drive source for increasing and reducing the absolute value of the physical acting force to restrain the vibration of the movable portion in driving to displace the movable portion in the first direction by the first drive source and therefore, the vibration of the movable portion can actively be reduced by operating the physical acting force in the direction reverse to the transition direction of the movable portion and decelerating the movable portion immediately before being brought into contact with the stopping member. As a result, the switching operation of the small thin film-movable element can be constituted by high speed. Further, since the vibration of the movable portion can be reduced, when the movable portion modulates light, vibration of emitted light can be reduced. Further, since the second drive source different from the first drive source is provided, a pattern of the physical acting force applied for controlling the vibration can be constituted by a variety thereof. Further, it is not necessary to superpose a complicated control signal only on the first drive source and therefore, the circuit constitution can be simplified and an increase in a burden of circuit operation can be prevented.

According to a small thin film-movable element array according to an aspect of the invention are one-dimensionally or two-dimensionally aligned with the small thin film-movable element according to the invention and therefore, the vibration after the movable portion reaches the finally displaced position is restrained, a time period of converging the vibration can be nullified or can considerably be shortened, and the address voltage can be written without needing to await for converging the vibration. Therefore, the switching operation can be constituted by high speed by shortening the drive cycle and high speed operation of a total of the array can be carried out. Further, although high accuracy is requested for an optical switch array for optical communication and therefore, an operational error caused by a variation in the individual elements needs to be corrected, according to the small thin film-movable element array, the operational error can easily be corrected by changing the displacement control signals of the individual small thin film-movable elements in correspondence with the correction.

According to a small thin film-movable element array according to an aspect of the invention, the image forming apparatus comprises the light source, the small thin film-movable element according to the invention, the illuminating optical system for irradiating light from the light source to the small thin film-movable element array, and the projecting optical system for projecting light emitted from the small thin film-movable element array to the image forming face and therefore, in comparison with the apparatus of the background art, the switching operation can be shortened. As a result, a photosensitive member can be exposed by high speed and by a number of gray scales and a display by a projector by a faster speed can be carried out.

BRIEF DESCRIPTION OF THE DRAWINGS

FIG. 13A is a perspective view of an essential portion, and FIG. 13B is a sectional view taken along a line P-P of FIG. 13A.

FIGS. 14A and 14B illustrate conceptual views showing a third exemplary embodiment of a small thin film-movable element according to the invention.

FIGS. 15A and 15B illustrates conceptual views showing a fourth exemplary embodiment of a small thin film-movable element according to the invention.

FIG. 16 is a plane view showing a fifth exemplary embodiment of applying a small thin film-movable element according to the invention to an RF switch.

FIGS. 17A and 17B illustrate explanatory views showing a D-D section of an OFF state of the RF switch shown in FIG. 16A and showing a D-D section of an ON state by FIG. 16B.

FIGS. 18A and 18B illustrate explanatory views showing an E-E section of the OFF state of the RF switch shown in FIG. 16A and showing the E-E section of the ON state by FIG. 16B.

FIGS. 27A to 27H illustrate explanatory views of control signals applied in a method of controlling a micromachine element of a background art.

FIG. 28 is an explanatory diagram showing a characteristic of a switch control method in an optical switch of a background art.

DETAILED DESCRIPTION OF THE INVENTION

A detailed explanation will be given of exempalry embodiments of a small thin film-movable element and a small thin film-movable element array as well as an image forming apparatus according to the invention in reference to the drawings as follows.

Figure 1:
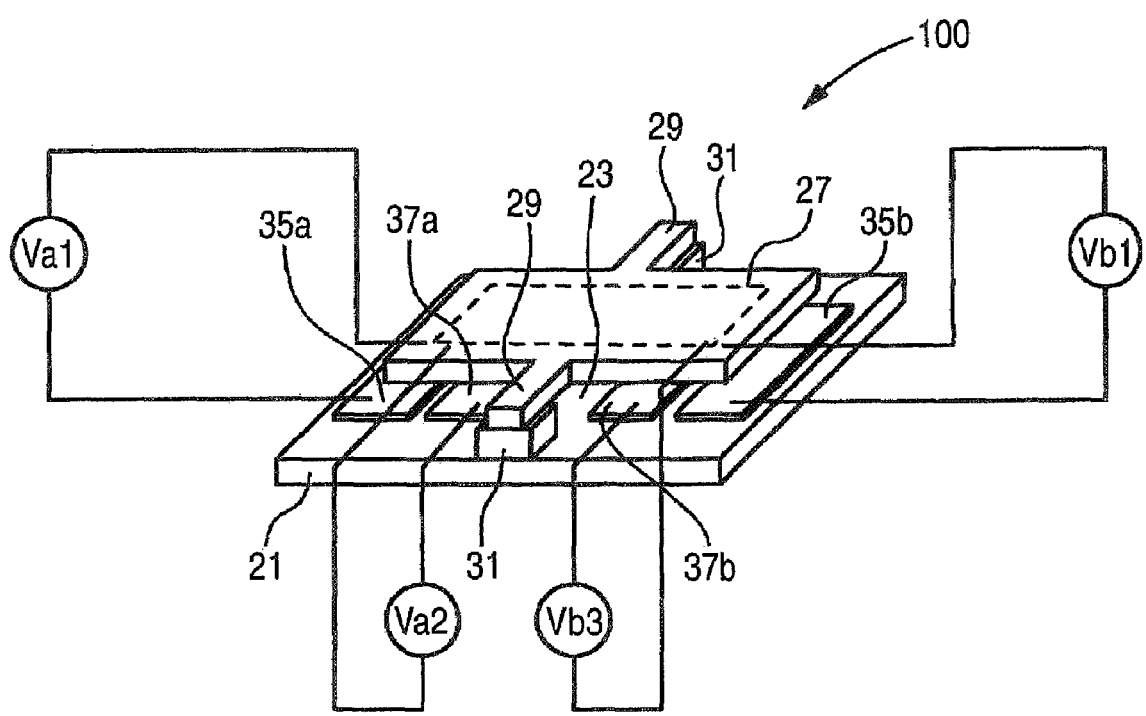
FIG. 1 is a conceptual view showing a first exemplary embodiment of a small thin film-movable element according to the invention.
Figure 2A:
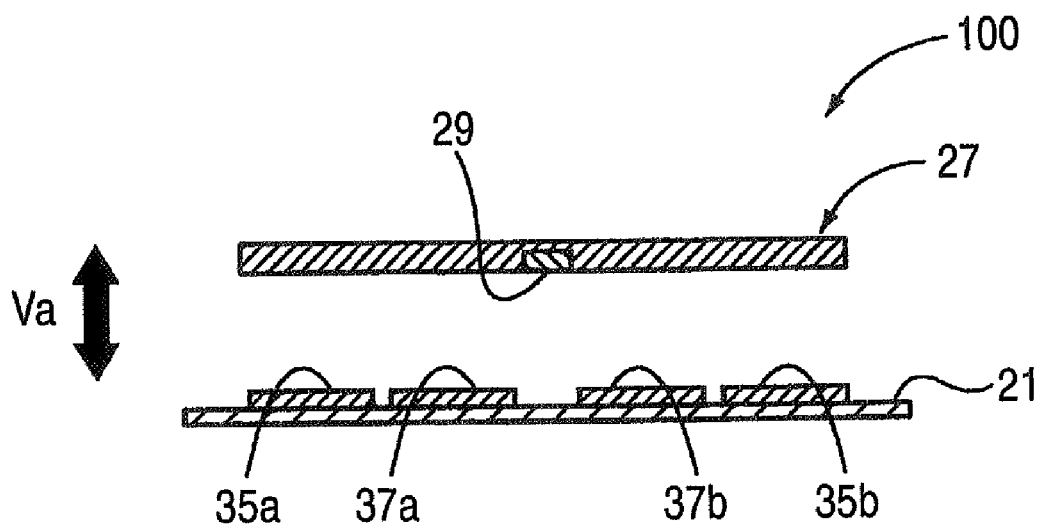
FIGS. 2A and 2B illustrate explanatory views of operation showing procedure of pivoting the small thin film-movable element shown in FIG. 1.
Figure 2B:
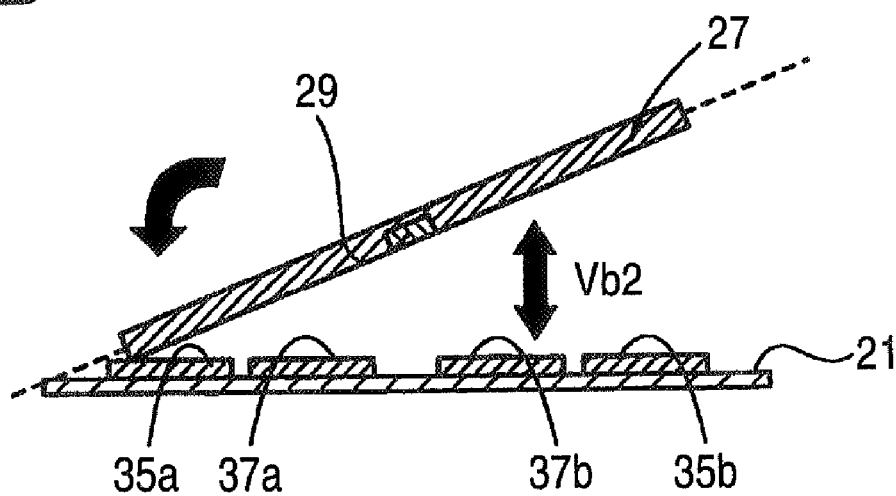
Figure 3A:
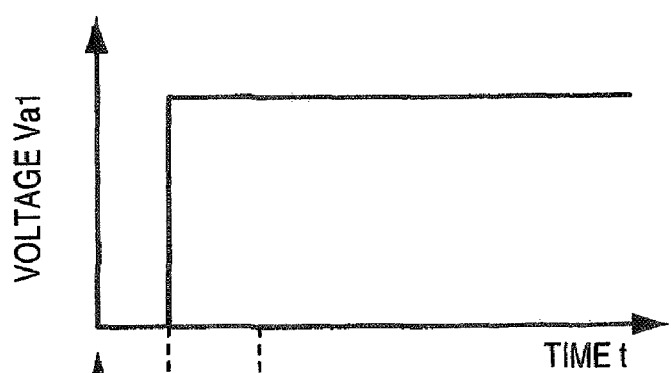
FIGS. 3A to 3E illustrate explanatory views of a vibration restraining operation showing modified example 1 in which a rectangular pulse waveform is applied immediately after contact.
Figure 3B:
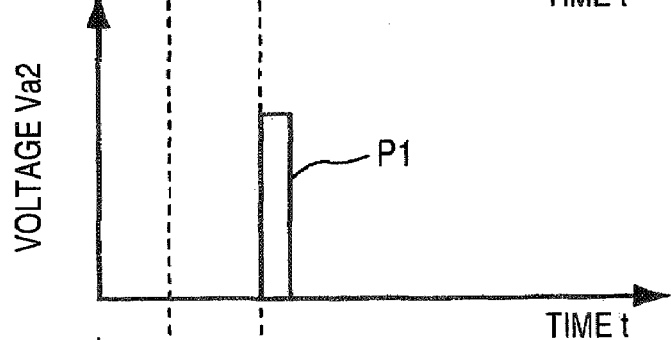
Figure 3C:
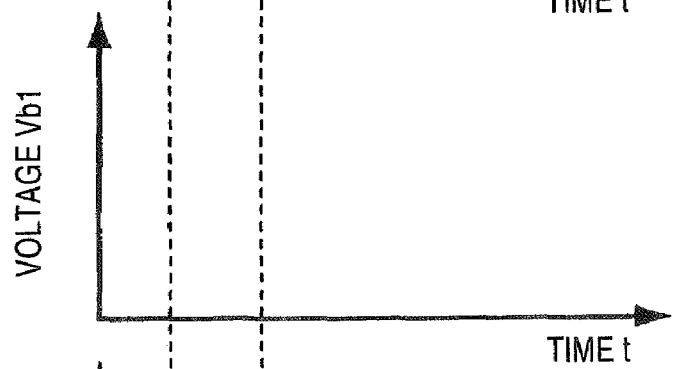
Figure 3D:
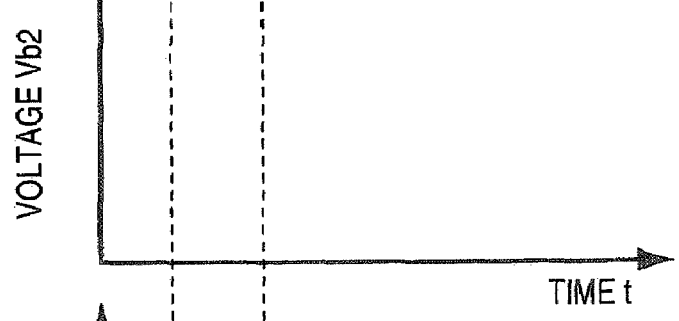
Figure 3E:
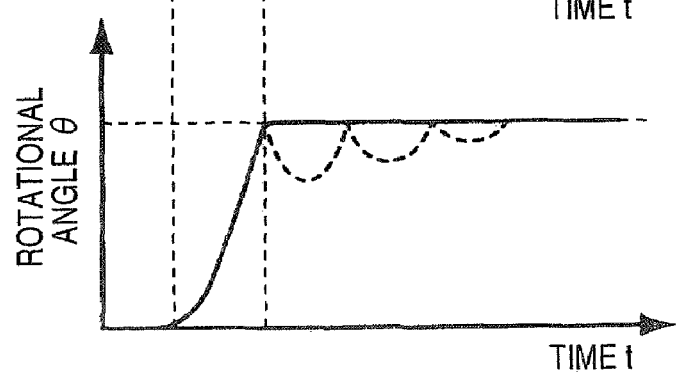
Figure 4A:
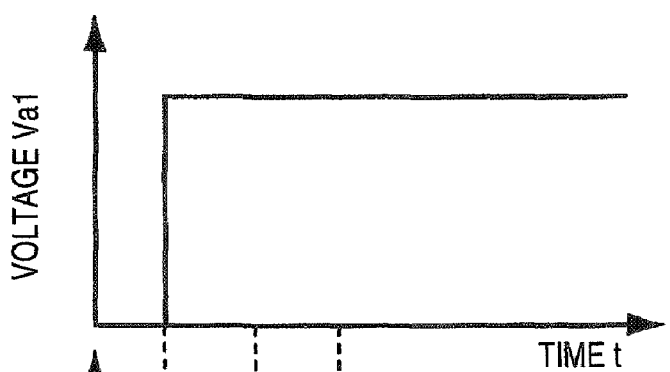
FIGS. 4A to 4E illustrate explanatory views of a vibration restraining operation showing modified example 2 in which two of rectangular pulse waveforms are applied immediately after contact.
Figure 4B:
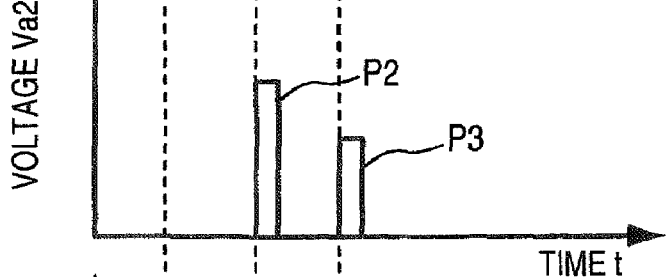
Figure 4C:
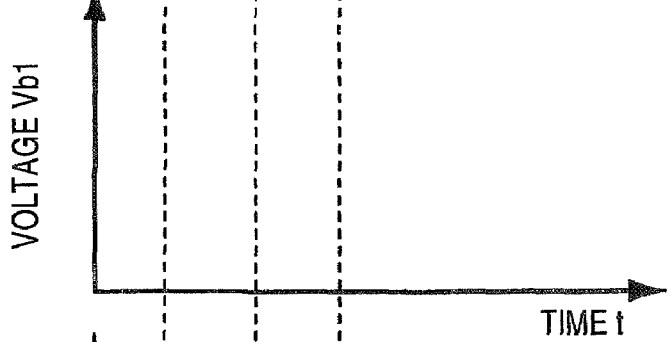
Figure 4D:
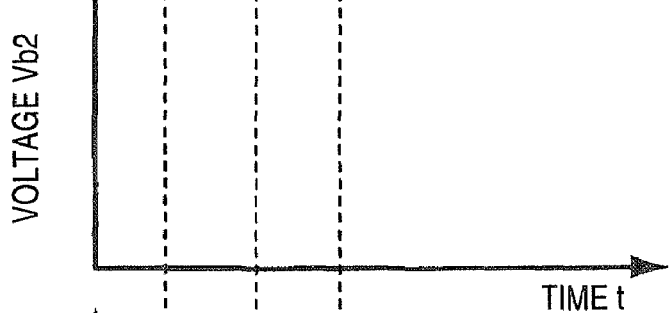
Figure 4E:
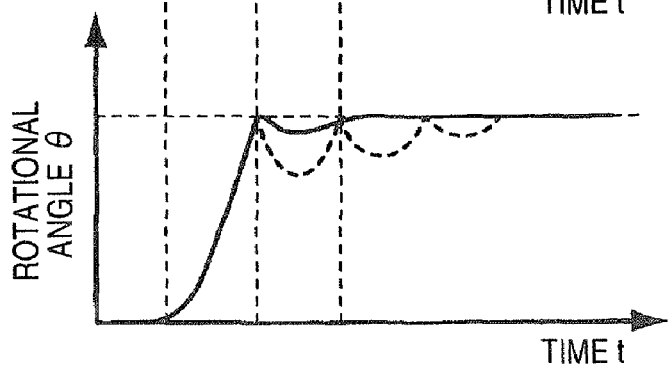
Figure 5A:
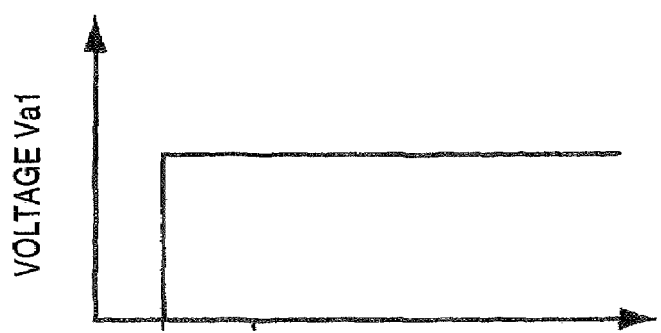
FIGS. 5A to 5E illustrate explanatory views of a vibration restraining operation showing modified example 3 of reducing a contact electrostatic force.
Figure 5B:
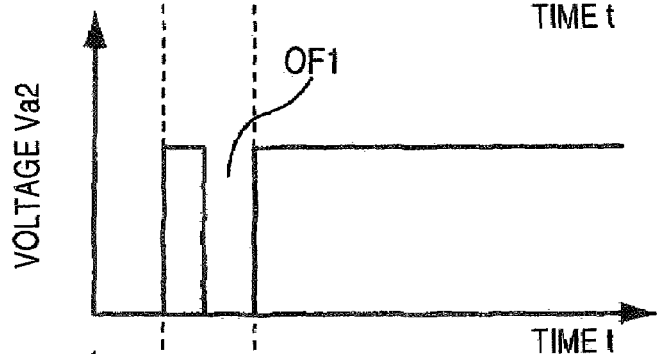
Figure 5C:
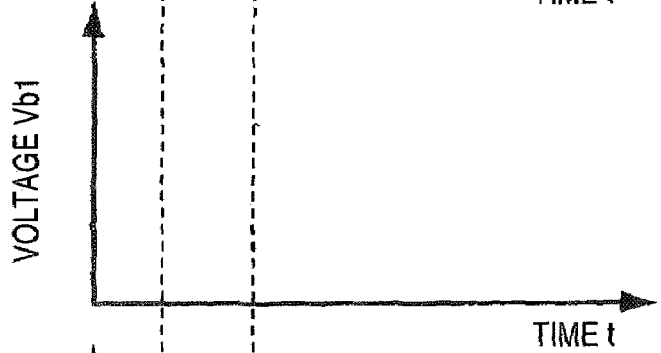
Figure 5D:
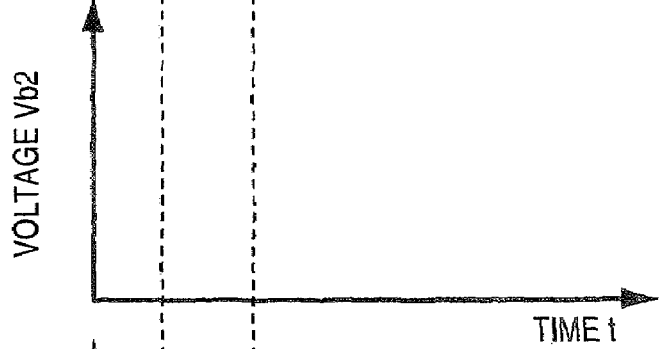
Figure 5E:
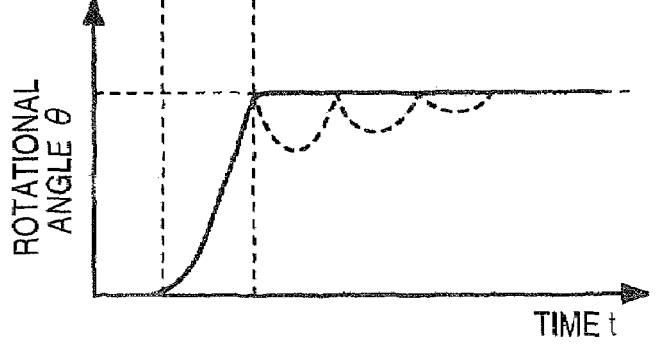
Figure 6A:
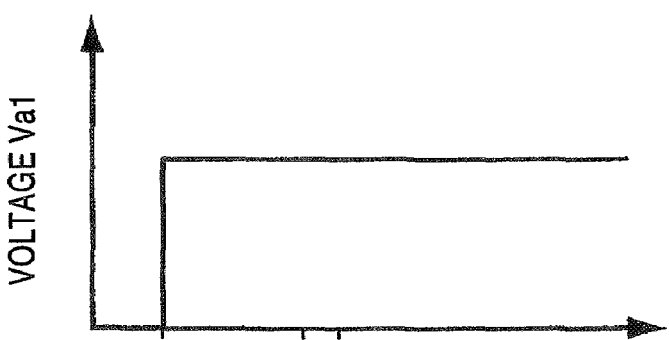
FIGS. 6A to 6E illustrates explanatory views of a vibration restraining operation showing modified example 4 of reducing an assisting electrostatic force in generating a vibration.
Figure 6B:
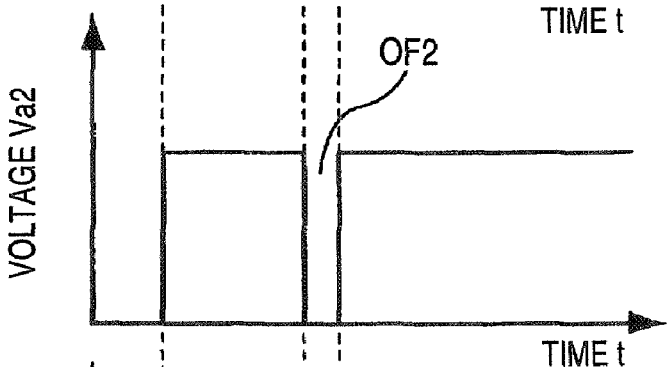
Figure 6C:
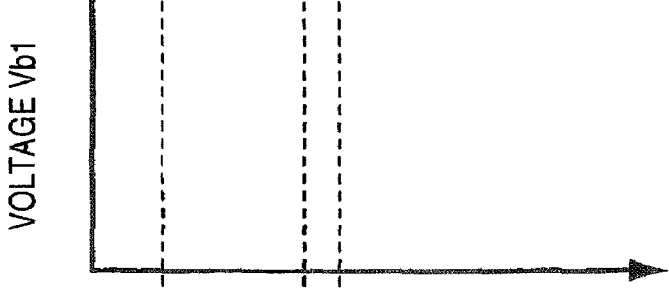
Figure 6D:
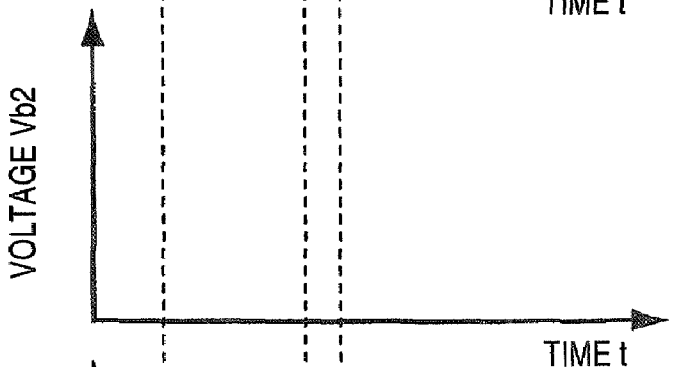
Figure 6E:
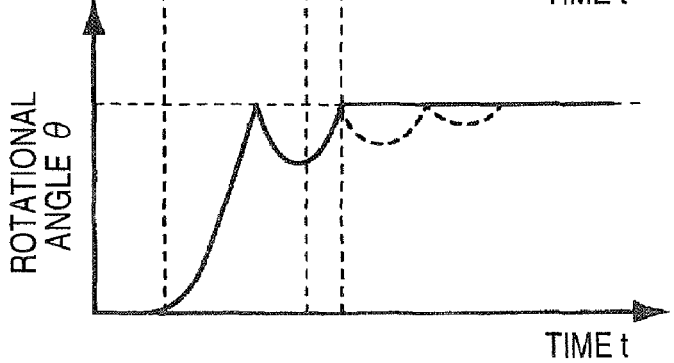
Figure 7A:
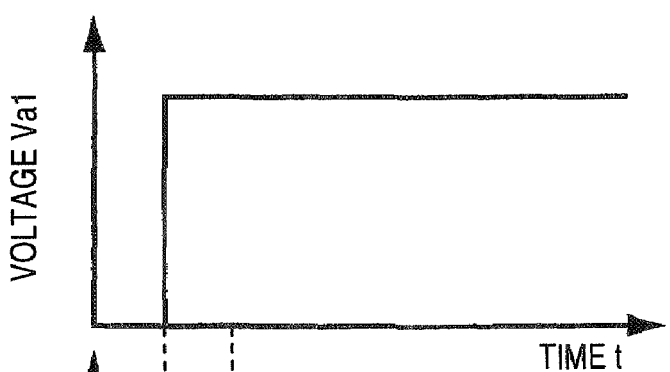
FIGS. 7A to 7E illustrate explanatory views of a vibration restraining operation showing modified example 5 of applying a pulse wave immediately before contact.
Figure 7B:
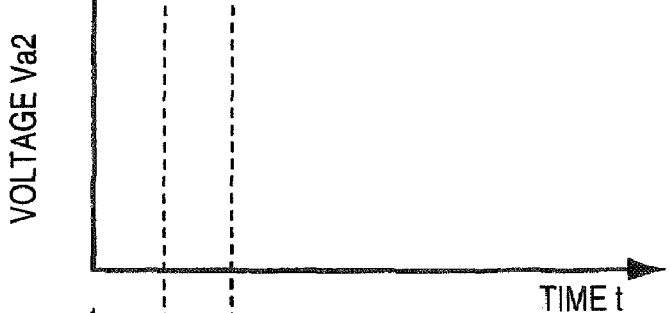
Figure 7C:
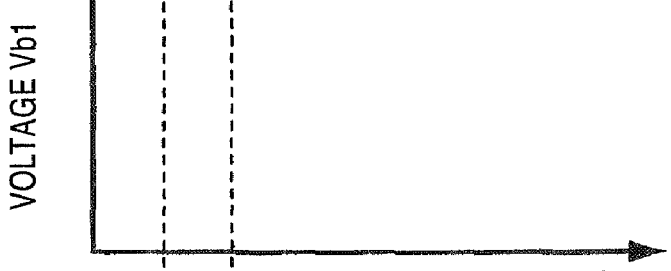
Figure 7D:
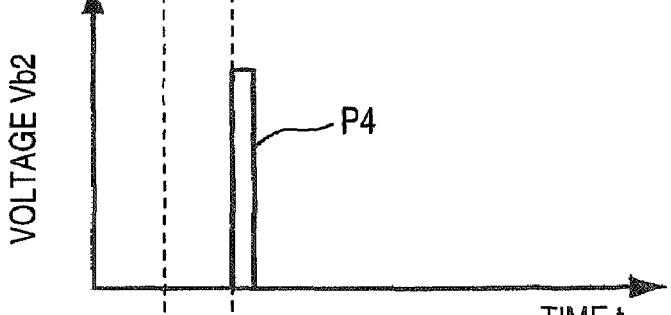
Figure 7E:
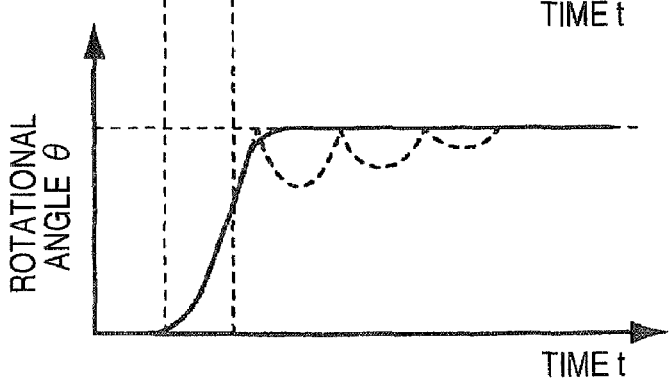
Figure 8A:
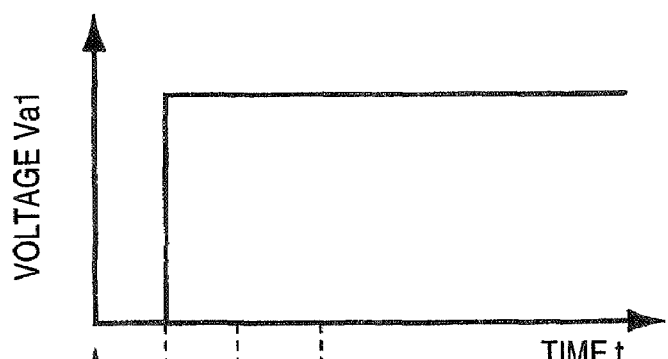
FIGS. 8A to 8E illustrate explanatory views of a vibration restraining operation showing modified example 6 of applying a plurality of pulse waves immediately before contact.
Figure 8B:
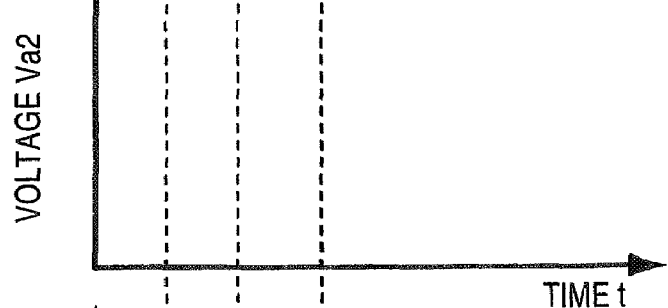
Figure 8C:
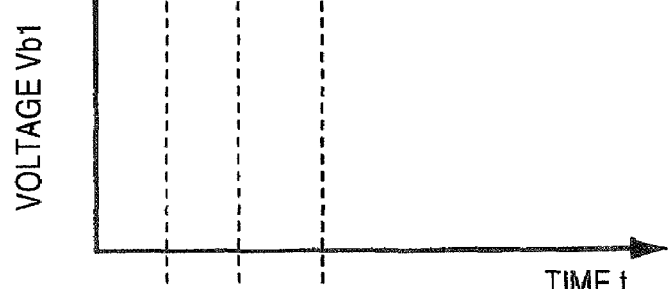
Figure 8D:
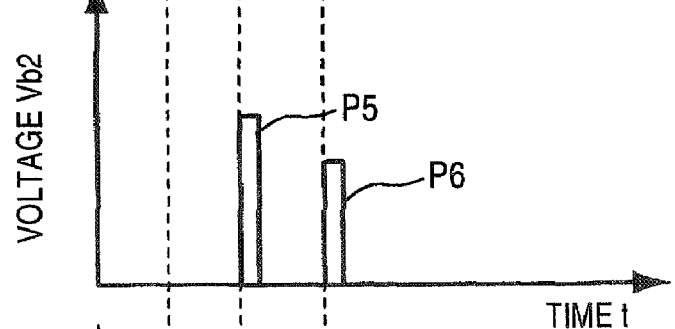
Figure 8E:
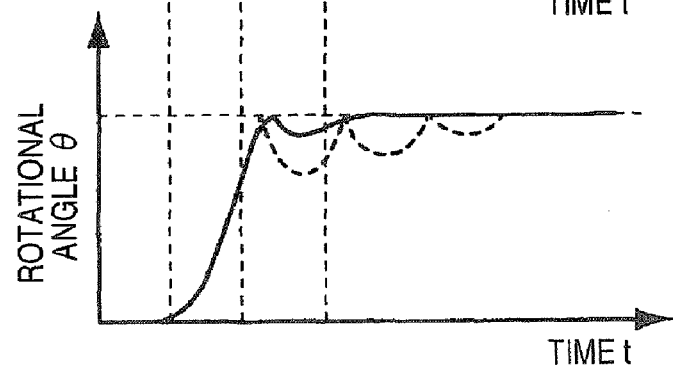
Figure 9A:
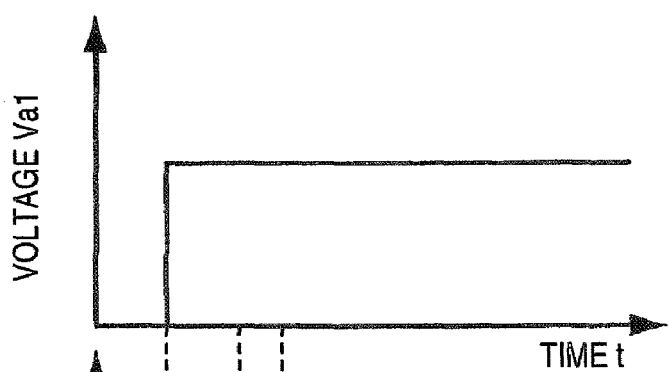
FIGS. 9A to 9E illustrate explanatory views of a vibration restraining operation showing modified example 7 of applying pulse waves immediately before and immediately after contact.
Figure 9B:
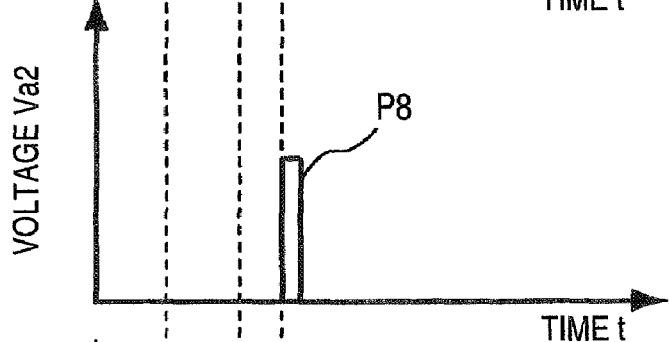
Figure 9C:
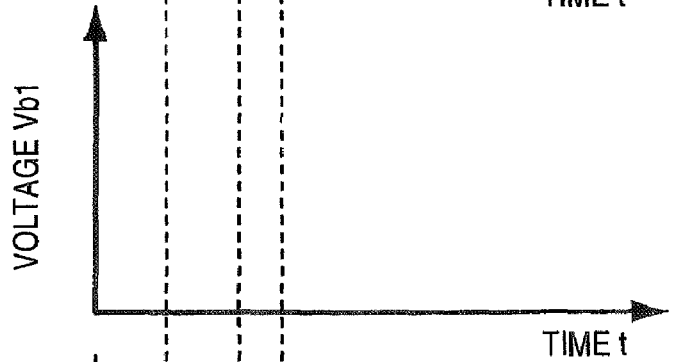
Figure 9D:
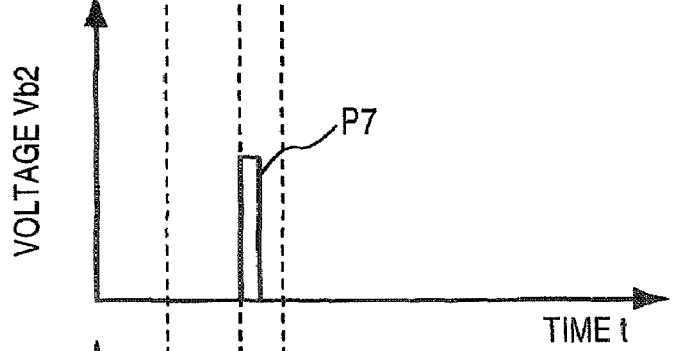
Figure 9E:
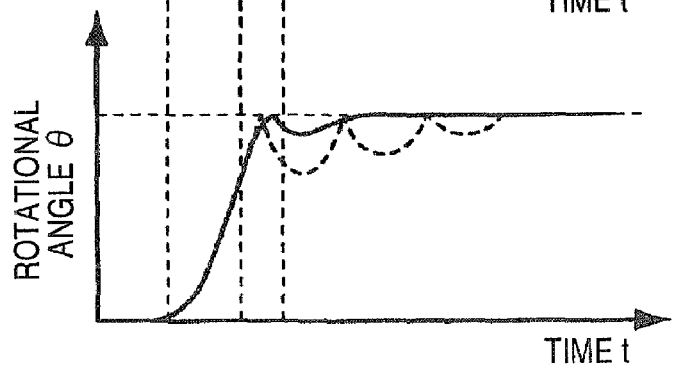
Figure 10A:
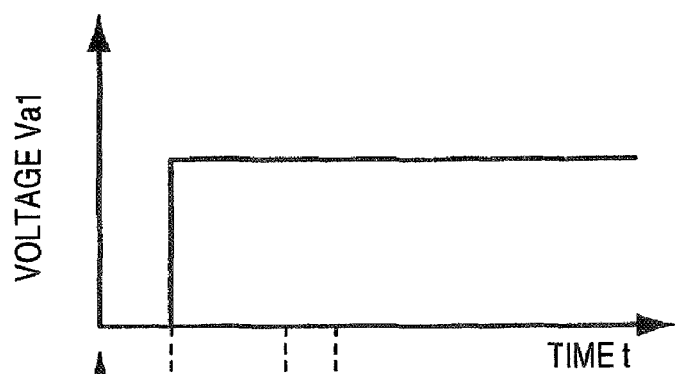
FIGS. 10A to 10E illustrate explanatory views of a vibration restraining operation showing modified example 8 of applying pulse waves immediately after and immediately before contact.
Figure 10B:
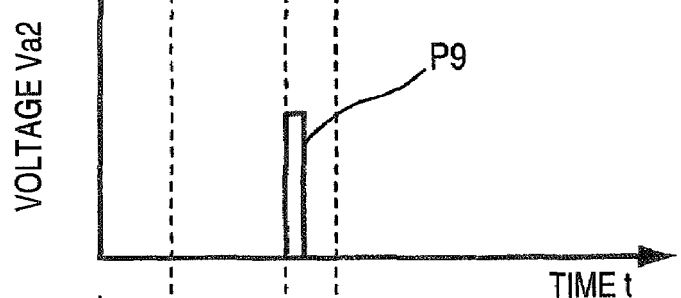
Figure 10C:
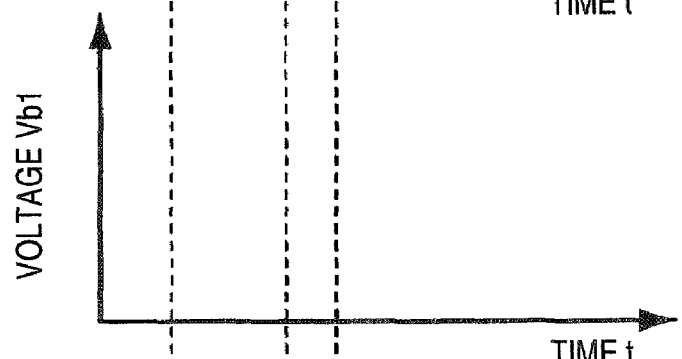
Figure 10D:
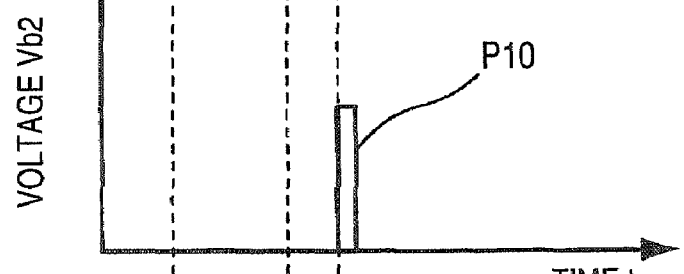
Figure 10E:
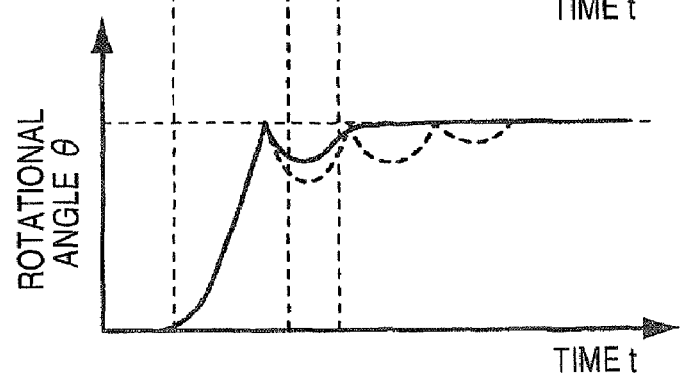
Figure 11A:
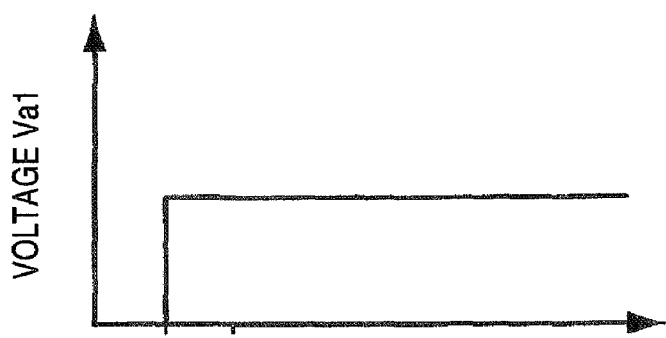
FIGS. 11A to 11E illustrate explanatory views of a vibration restraining operation showing modified example 9 of reducing a forward electrostatic force and applying an inverse direction electrostatic force immediately before contact.
Figure 11B:
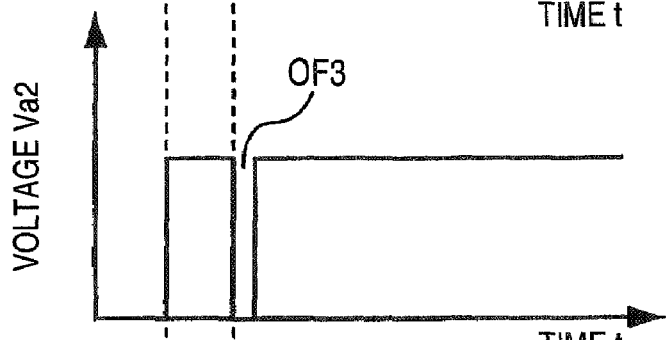
Figure 11C:
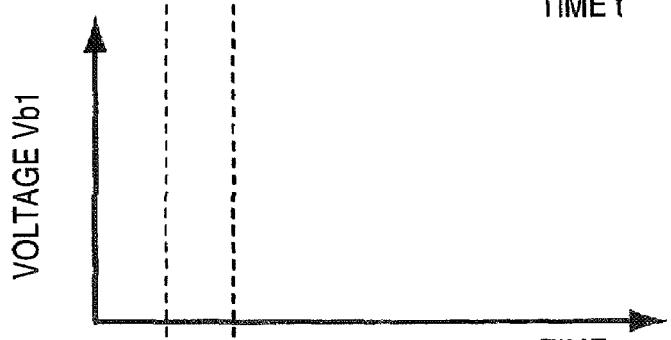
Figure 11D:
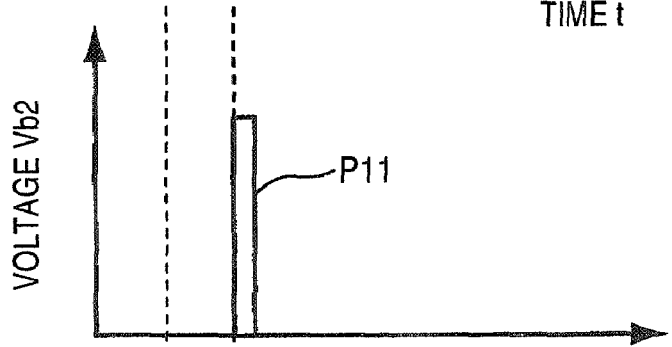
Figure 11E:
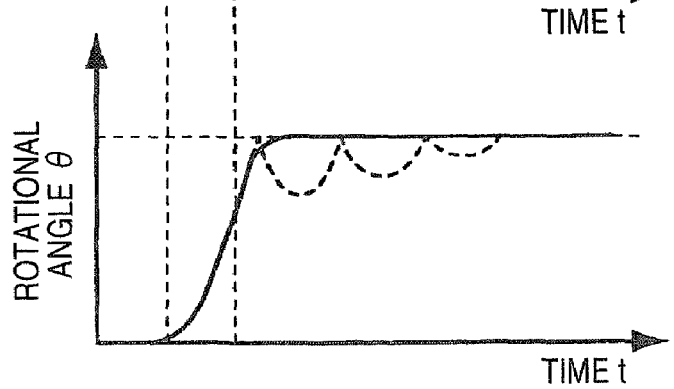
Figure 12A:
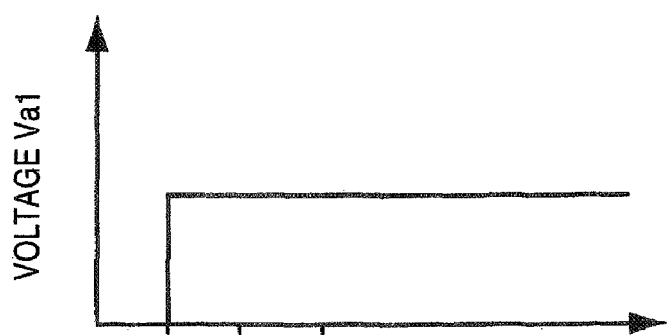
FIGS. 12A to 12E illustrate explanatory views of a vibration restraining operation showing modified example 10 of reducing a forward direction electrostatic force by a plurality of times and applying an inverse direction electrostatic force by a plurality of times immediately before contact.
Figure 12B:
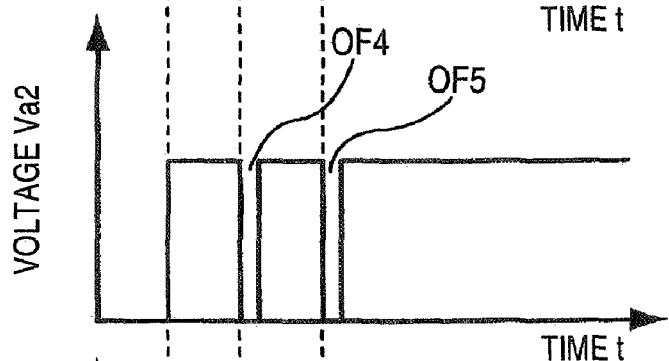
Figure 12C:
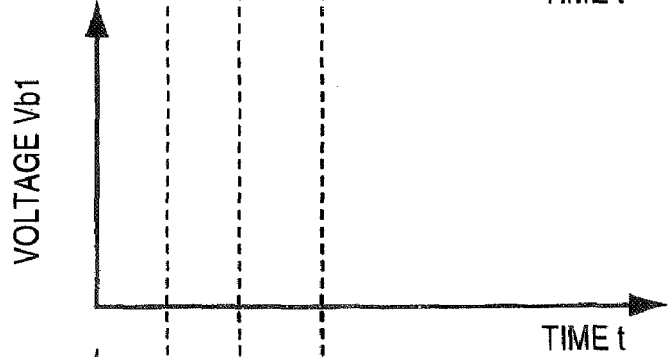
Figure 12D:
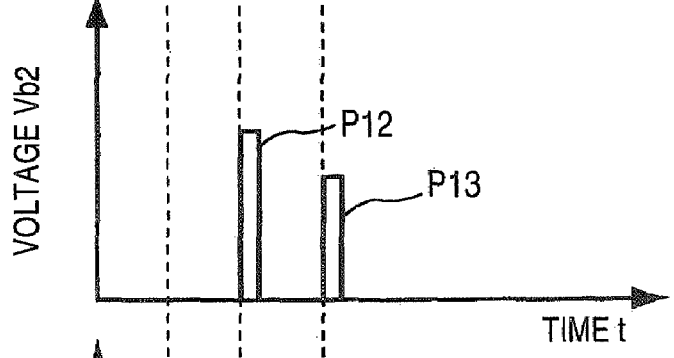
Figure 12E:
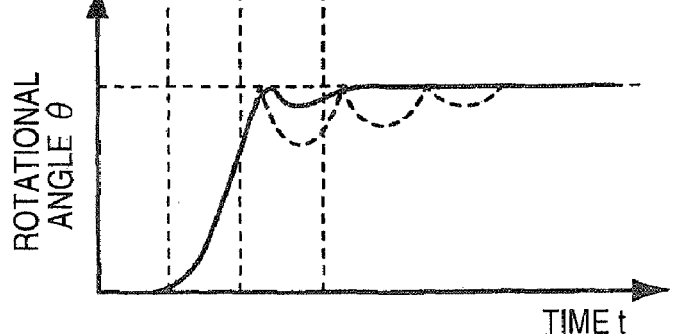

FIG. 1 is a conceptual view showing a first exemplary embodiment of a small thin film-movable element according to the invention. FIGS. 2A and 2B illustrate explanatory views of operation showing a procedure of pivoting the small thin film-movable element shown in FIG. 1.

A small thin film-movable element 100 according to the embodiment includes a board 21, a movable portion 27 in a shape of a small piece arranged in parallel with the board 21 by way of a gap 23, hinges 29, 29 constituting support portions extended from both edge portions of the movable portion 27, and spacers 31, 31 for supporting the movable portion 27 by the board 21 by way of the hinges 29, 29 as a basic constitution of a displacement structure. By such a constitution, the movable portion 27 can rotationally be displaced by twisting the hinges 29, 29.

According to the small thin film-movable element 100, an upper face of the movable portion 27 constitutes a light reflecting portion (micromirror portion). Otherwise, the small thin film-movable element according to the invention can switch a sound wave, a fluid, a heat ray, or also switch an RF signal by pertinently selecting a material of the movable portion 27, or attaching a shortcircuit contact or the like.

According to the embodiment, in reaching a final position of a displacement in a specific direction, the movable portion 27 is brought into contact with the board 21 or a stopping member, not illustrated, to be stopped thereby. That is, the movable thin film movable element of a contact type is constituted.

An upper face of the board 21 is provided with a first address electrode 35a and a second address electrode 35b constituting fixed electrodes on both sides thereof centering on the hinges 29, 29. Further, also the movable portion 27 is provided with a movable electrode, not illustrated, at a portion thereof. The small thin film-movable element 100 is provided with a drive circuit, not illustrated, at inside of the board 21, the drive circuit applies voltages between the movable portion 27 and the first address electrode 35a and between the movable portion 27 and the second address electrode 35b. The small thin film-movable element 100 pivots to displace the movable portion 27 by constituting a center of twist by the hinges 29, 29 by applying voltages to the first address electrode 35a, the second address electrode 35b, the movable portion 27 as basic operation. That is, the movable portion 27 constitutes a micromirror portion and therefore, a direction of reflecting light is switched.

According to the small thin movable element 100, when a potential difference is provided to the first address electrode 35a, the second address electrode 35b relative to the movable portion 27, electrostatic forces are generated between the respective electrodes and the movable portion 27 and a rotational torque is operated centering on the hinges 29, 29. The electrostatic force generated at this occasion depends on a dielectric constant of a surrounding atmosphere, an area of the movable portion 27, an applied voltage, and an interval between the movable portion 27 and the address electrode.

Therefore, when the dielectric constant of the surrounding atmosphere, the area of the movable portion 27, the interval between the movable portion 27 and the address electrode, and an elastic coefficient of the hinges 29, 29 are constant, the movable portion 27 can rotationally be displaced in a left and right direction by controlling potentials of the respective electrodes. For example, when a voltage Va is applied between the movable portion 27 and the first address electrode 35a and Va1>Vb1, as shown by FIG. 2A, an electrostatic force generated between the first address electrode 35a and the movable portion 27 becomes larger than an electrostatic force generated between the second address electrode 35b and the movable portion 27, as shown by FIG. 2B, the movable portion 27 is inclined to a left side. Conversely, when Va1<Vb1, the electrostatic force generated between the second address electrode 35b and the movable portion 27 becomes larger than the electrostatic force generated between the first address electrode 35a and the movable portion 27, and the movable portion 27 is inclined to a right side, although illustration thereof is omitted.

In this way, the movable electrode of the movable portion 27, the first address electrode 35a, the second address electrode 35b constitute a drive source for rotationally displacing the movable portion 27. By constituting a physical acting force applied from the drive source to the movable portion 27 by the electrostatic force, high speed rotational displacement can be carried out.

Further, the physical acting force operated to the movable portion 27 may be a physical acting force other than the electrostatic force. As other physical acting force, for example, a piezoelectric effect or an electromagnetic force can be pointed out. In this case, as a drive source, a piezoelectric actuator using a piezoelectric element, or an electromagnetic actuator using a magnet and a coil is adopted.

In this way, the small thin film-movable element 1 includes the movable portion 27 which is displaced bidirectionally and the movable portion 27 is provided with a switching function. The movable portion 27 is rotated to displace by a plurality of first drive sources (movable electrode of movable portion 27, first address electrode 35a, second address electrode 35b) for applying the physical acting force. The small thin film-movable element 100 according to the embodiment is operated with the electrostatic force as physical acting force. The electrostatic force attracts the movable portion 27 to a side of the board 21 against a gravitational force, an elastic force of the hinges 29, 29. A state of pivoting displace the movable portion 27 by the electrostatic force in this way to adsorb (pull) a pivoting front end to the board 21 is referred as (pull-in). That is, the movable portion 27 is displaced by the electrostatic force generated when a displacement control signal applied to the movable electrode, the first address electrode 35a, the second address electrode 35b reaches a pull-in voltage.

A state before reaching the pull-in voltage is referred to as an analog control region and the displacement control signal is not controlled by binary values. That is, a region capable of executing a stepless analog control is constituted.

Meanwhile, the small thin film-movable element 100 according to the embodiment is provided with a second drive source different from the first drive source for increasing and reducing an absolute value of the physical acting force to restrain vibration of the movable portion 27 in driving to displace the movable portion 17 in a first direction (left rotational direction) of FIG. 2 by the first drive source. The first drive source comprises the movable electrode of the movable portion 27, a first vibration control electrode 37a, a second vibration control electrode 37b arranged on inner sides of the first address electrode 35a, the second address electrode 35b by interposing the hinge 29. A vibration control voltage Va2 can be applied between the movable electrode of the movable portion 27 and the first vibration control electrode 27a and a vibration control voltage Va2 can be applied between the movable electrode of the movable portion 27 and the second vibration control electrode 37b by a control portion, mentioned later. Further, the first vibration control electrode 37a and the second vibration control electrode 37b may respectively be arranged on outer sides of the first address electrode 37a and the second address electrode 37b conversely to the embodiment.

According to the embodiment, the movable portion 27 is brought into contact with a stopping member (grounding site), not illustrated, to be stopped thereby in reaching a final position of a displacement in a specific direction. That is, the small thin film-movable element 100 is operated as a so-to-speak contact type. In this case, although the movable portion 27 receives a repulsive force from the stopping member immediately after being grounded, the movable portion 27 is braked by the physical acting force and is forcibly damped. Further, although according to the embodiment, an explanation will be given by taking an example of the contact type in which the movable portion 17 is brought into contact with the stopping member, the invention is applicable also to a noncontact type in which the movable portion 27 is not brought into contact therewith at a finally displaced position.

The physical acting force of displacing the movable portion 27 in the first direction and the second direction (right rotational direction of FIGS. 2A to 2C) by the second drive source is the electrostatic force similar to that of the first drive source. By constituting the physical acting force for displacing the movable portion 27 by the electrostatic force, a high speed vibration restraining force is achieved. That is, according to a basic braking operation of the embodiment, immediately before the movable portion 27 shown in FIG. 2B is brought into contact with the stopping member, not illustrated, the vibration control voltage Vb2 is applied to the movable electrode of the movable portion 27 and the second vibration control electrode 37b.

When the electrostatic force is operated in a direction reverse to a transition direction of the movable portion 27, the movable portion 27 is decelerated immediately before being brought into contact with the stopping member, the movable portion 27 is restrained from reaching the finally displaced position by a large speed as in the background art, or a displacement in the direction reverse to the transition direction of the movable portion 27 by the repulsive force after having been brought into contact with the stopping member is restrained and vibration of the movable portion 27 is actively reduced. That is, the electrostatic force generated by the vibration control voltage Vb2 is operated as a brake force (brake) against a moment in the counterclockwise direction of the movable portion 27. Thereby, the movable portion 27 is controlled to be stationary simultaneously with being brought into contact with the stopping member.

In this way, according to the small thin film-movable element 100, it is preferable to control the movable portion 27 such that the speed of the movable portion 27 is substantially nullified when the movable portion 27 reaches the final position of the displacement in the specific direction. Thereby, vibration by impact produced when the movable portion of the background art reaches the finally displaced position by the large speed, or overshoot when the movable portion reaches the finally displaced position in a case in which the movable portion is driven in noncontact is not brought about.

As in the above-described constitution, the small thin film-movable element 100 is constituted such that the physical acting force is applied to a plurality of operating points of the movable portion 27. That is, the physical acting force can be applied to the left side and to the right side interposing the hinge 29. Therefore, for example, as in the embodiment, in the movable portion 27 of a pivoting type constituting a rotational center by a center thereof, the physical acting force is applied to both sides centering on the rotational center, braking forces having different magnitudes are applied to the respective operating points by different timings. Thereby, a variety of vibration restraining effects (variation in restraining vibration), mentioned later, are achieved.

Further, the physical acting force can be applied by a shape of a pulse waveform constituting the ordinate by an intensity of the physical acting force and constituting the abscissa by time. The physical acting force is generated in a range of a voltage specified by the pulse waveform. Further, the pulse wave here includes a rectangular wave, a sine wave, a cosine wave, a sawtooth wave, a triangular wave and synthesized waves thereof. Further, the physical acting force can also be generated by a plurality of pulse waves. By applying the physical acting force by different magnitudes, different timings in this way, a variety of the vibration restraining effects can further be achieved.

Next, in order to restrain vibration of the movable portion 17, an explanation will be given of modified examples of various pulse waveforms applied to the first drive source, the second drive source.

FIGS. 3A to 3E illustrate explanatory views of a vibration restraining operation showing modified example 1 of applying a rectangular pulse waveform immediately after contact.

According to modified example 1, the electrostatic force is applied to the movable portion 27 in the first direction by applying a pulse P1 to the second drive source (movable electrode of movable portion 27, first vibration control electrode 37a) when the movable portion is going to be transited in the second direction different from the first direction, or during a time period of being transited after driving to displace the movable portion 27 in the first direction. By applying the electrostatic force in the first direction to the movable portion 27 after the movable portion 27 is driven to displace in the first direction to reach the final position of the displacement, further, during a time period of being transited in the second direction by a repulsive force, or an elastic force by being brought into contact with the stopping member, movement (trajectory in a shape of a broken line wave in the drawing) of the movable portion 27 which is going to be separated from the final position of the displacement is actively braked.

FIGS. 4A to 4E illustrate explanatory views of a vibration restraining operation showing modified example 2 of being applied with two of rectangular pulse waveforms immediately after contact.

According to the modified example 2, when the movable portion 27 is driven to displace in the first direction, thereafter, the movable portion 27 is brought into contact with the stopping member and vibration is generated by a repulsive force thereof, by applying pulses P2, P3 to the second drive source (movable electrode of movable portion 27, first vibration control electrode 37a) during respective time periods of transiting in the second direction different from the pulse direction, a plurality of times of the physical acting forces are applied to the movable portion 27 in the first direction. Thereby, during a time period in which the movable portion 27 is being transited in the second direction by the repulsive force, the electrostatic force in the first direction is applied, and movement (trajectory in shape of broken line wave in the drawing) of the movable portion 27 which is going to be separated from the final position of the displacement is actively braked. Further, although the pulse waves P2, P3 are exemplified in the drawing, two or more of the pulse waves may naturally be provided.

FIGS. 5A to 5E illustrate explanatory views of a vibration restraining operation showing modified example 3 of reducing the contact electrostatic force.

According to modified example 3, the movable portion 27 is driven in the first direction by the first drive source and the second drive source. That is, the first vibration control electrode 37a is utilized as the drive electrode. Further, the vibration control voltage Va2 applied to the movable electrode of the movable portion 27 and the first vibration control electrode 37a is made OFF by a constant timing OF1 immediately before the movable portion 27 is brought into contact with the stopping member. Therefore, the movable portion 27 is controlled such that a speed thereof immediately before being brought into contact with the stopping member is decelerated and the speed of the movable portion 27 is substantially nullified. Thereby, vibration by impact produced when the movable portion of the background art reaches the finally displaced position by the large speed is not generated.

FIGS. 6A to 6E illustrate explanatory views of a vibration restraining operation showing modified example 4 of reducing an assisting electrostatic force in generating vibration.

According to modified example 4, when the movable portion 27 is brought into contact with the stopping member, thereafter, the movable portion 27 is temporarily separated from the stopping member by the repulsive force from the stopping member, the electrostatic force when the movable portion 27 is proximate to the stopping member again by elastic force of the hinges 29, 29 is reduced by making the vibration control voltage Va2 continuing to be applied between the movable electrode of the movable portion 27 and the first vibration control electrode 37a OFF by a constant timing OF2. That is, when the vibrating portion 27 becomes proximate to the stopping member again by the elastic force, it is canceled that the electrostatic force by the second drive source is operated by constituting an assisting force. Thereby, vibration by impact produced when the movable portion 27 is brought into contact therewith, thereafter, reaches the stopping member again by the large speed is not brought about.

FIGS. 7A to 7E illustrate explanatory views of a vibration restraining operation showing modified example 5 of applying a pulse wave immediately before contact.

According to modified example 5, immediately before the movable portion 27 is brought into contact with the stopping member, a pulse wave P4 by the vibration control voltage Vb2 is applied between the movable electrode of the movable portion 27 and the second vibration control electrode 37b. Therefore, during a time period in which the movable portion 27 is being transited before reaching the finally displaced position, the electrostatic force is operated in the direction (clockwise direction) reverse to the transiting direction (counterclockwise direction), and the speed of the movable portion 27 immediately before reaching the finally displaced position is decelerated. Thereby, vibration by impact produced when the movable portion of the background art reaches the finally displaced position by the large speed is restrained. That is, vibration of the movable portion 27 in being brought into contact therewith can actively be reduced.

FIGS. 8A to 8E illustrate explanatory views of a vibration restraining operation showing modified example 6 of applying a plurality of pulse waves immediately before contact.

According to modified example 6, immediately before the movable portion 17 is brought into contact with the stopping member, a pulse wave P5 by the vibration control voltage Vb2 is applied between the movable electrode of the movable portion 27 and the second vibration control electrode 37b, and immediately before the movable portion 27 is brought into contact with the stopping member again by the elastic force since the movable portion 27 cannot be hampered from being moved to be separated therefrom also thereby, a pulse wave P6 by the vibration control voltage Vb2 is applied between the movable electrode of the movable portion 27 and the second vibration control electrode 37b. Therefore, during respective time periods of being transited in the first direction, the electrostatic forces are applied in the second direction by a plurality of times. That is, braking is applied by a plurality of times. Further, although two of the pulse waves P5, P6 are exemplified in the drawing, there may naturally be two or more of the pulse waves.

FIGS. 9A to 9E illustrate explanatory views of a vibration restraining operation showing modified example 7 of applying pulse waves immediately before and immediately after contact.

According to modified example 7, immediately before the movable portion 27 is brought into contact with the stopping member, a pulse wave P7 by the vibration control voltage Vb2 is applied between the movable electrode of the movable portion 27 and the second vibration control electrode 37b, after the movable portion 27 is brought into contact with the stopping member, a pulse P8 by the vibration control voltage Va2 is applied between the movable electrode of the movable portion 27 ad the first vibration control electrode 37a. Therefore, the speed immediately before the movable portion 27 reaches the finally displaced position is decelerated, and after reaching the final position of the displacement is decelerated, movement (trajectory in shape of broken wave in the drawing) of the movable portion 27 which is going to be separated from the final position of the displacement is actively braked.

FIGS. 10A to 10E illustrate explanatory views of a vibration restraining operation showing modified example 8 of applying pulse waves immediately after and immediately before contact.

According to modified example 8, after the movable portion 27 is brought into contact with the stopping member, a pulse P9 by the vibration control voltage Va2 is applied between the movable electrode of the movable portion 27 and the first vibration control electrode 37a, immediately before the movable portion 27 is brought into contact with the stopping member again, a pulse wave P10 by the vibration control voltage Vb2 is applied between the movable electrode of the movable portion 27 and the second vibration control electrode 37b. Therefore, after the movable portion 27 reaches the final position of the displacement, movement (trajectory in shape of broken line wave in the drawing) of the movable portion 27 which is going to be separated from the final position of the displacement is braked, and the speed of the movable portion 27 when the movable portion 27 is temporarily separated from the stopping member by the repulsive force from the stopping member and is proximate to the stopping member again by the elastic force of the hinges 29, 29 is decelerated and the movable portion 27 is actively braked.

FIGS. 11A to 11E illustrate explanatory views of a vibration restraining operation showing modified example 9 of reducing the electrostatic force in a forward direction and applying the electrostatic force in a reverse direction immediately before contact.

According to modified example 9, the vibration control voltage Va2 applied between the movable electrode of the movable portion 27 and the first vibration control electrode 37a is made OFF by a constant timing OF3 immediately before the movable portion 27 is brought into contact with the stopping member. In addition thereto, immediately before the movable portion 27 is brought into contact with the stopping member, a pulse wave P11 by the vibration control voltage Vb2 is applied between the movable electrode of the movable portion 27 and the second vibration control electrode 37b. Therefore, the speed of the movable portion 27 immediately before being brought into contact with the stopping member is decelerated by both of a reduction in the drive electrostatic force and braking and the speed of the movable portion 27 is controlled to be substantially nullified. Thereby, vibration when the movable portion 27 is brought into contact therewith can actively be reduced, and vibration by impact produced when the movable portion of the background art reaches the finally displaced position by the large speed is not brought about.

FIGS. 12A to 12E illustrate explanatory views of a vibration restraining operation showing modified example 10 of reducing the electrostatic force in the forward direction by a plurality of times and applying the electrostatic force in the reverse direction by a plurality of times immediately before contact.

According to modified example 10, the voltage Va2 is made OFF by constant timings OF4, OF5, and pulse waves P12, P13 by the vibration control voltage Vb2 are applied by a plurality of times (2 times according to the modified example). Therefore, at respective times of bringing the movable portion 27 into contact with the stopping member, the speed immediately therebefore is decelerated by both of the reduction in the drive electrostatic force and braking and the speed of the movable portion 27 is controlled to be substantially nullified. Thereby, vibration of the movable portion 27 in being brought into contact therewith can actively be reduced, and vibration by impact produced when the movable portion of the background art reaches the finally displaced position by the large speed is not brought about further firmly.

Therefore, according to the small thin film-movable element 100, there is provided the second drive source different from the first drive source for increasing or reducing the absolute value of the physical acting force to restrain vibration of the movable portion 27 in driving to displace the movable portion 27 in the first direction by the first drive source and therefore, vibration of the movable portion 27 can actively be reduced by decelerating the movable portion 27 immediately before being brought into contact with the stopping member by operating the physical acting force in the direction reverse the transition direction of the movable portion 27. As a result, the switching operation of the small thin film-movable element 100 can be constituted by high speed. Further, since vibration of the movable portion 27 can be reduced, when the movable portion 27 executes optical modulation, vibration of emitted light can be reduced. Further, since the second drive source different from the first drive source is provided, a pattern of the physical acting force applied for controlling vibration can be diversified. Further, it is not necessary to superpose a complicated control signal only to the first drive source, a circuit constitution can be simplified and an increase in a burden of circuit operation can be prevented.

Next, an explanation will be given of a second exemplary embodiment of a small thin film-movable element according to the invention.

Figure 13A:
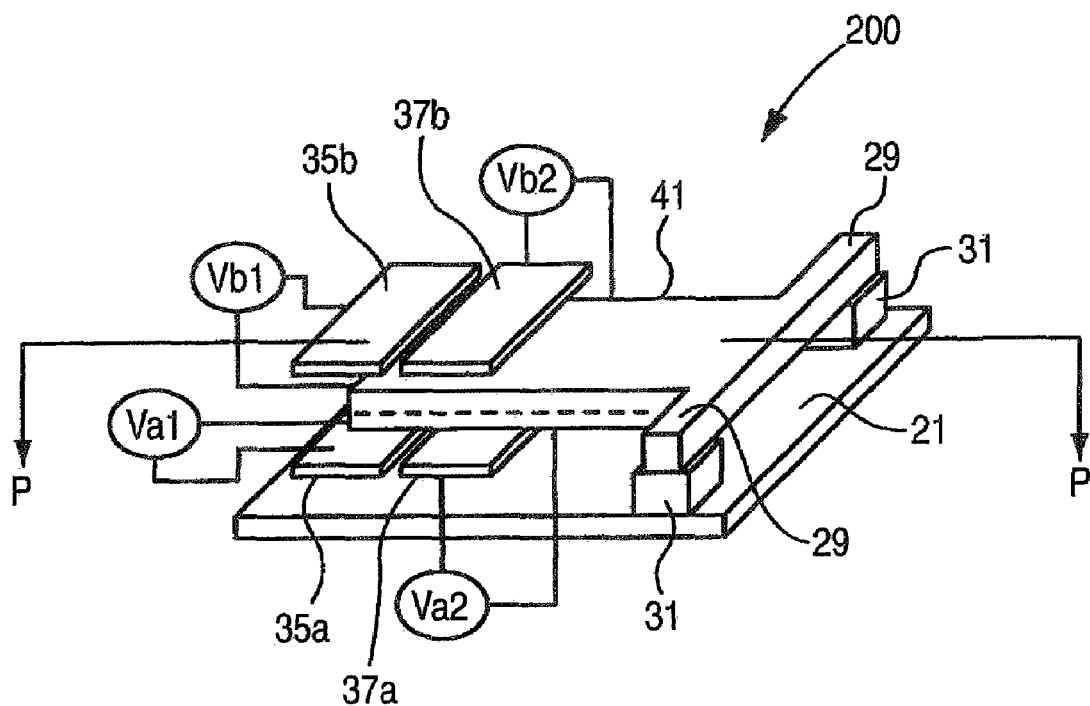
FIGS. 13A and 13B illustrate conceptual views showing a second exemplary embodiment of a small thin film-movable element according to the invention.
Figure 13B:
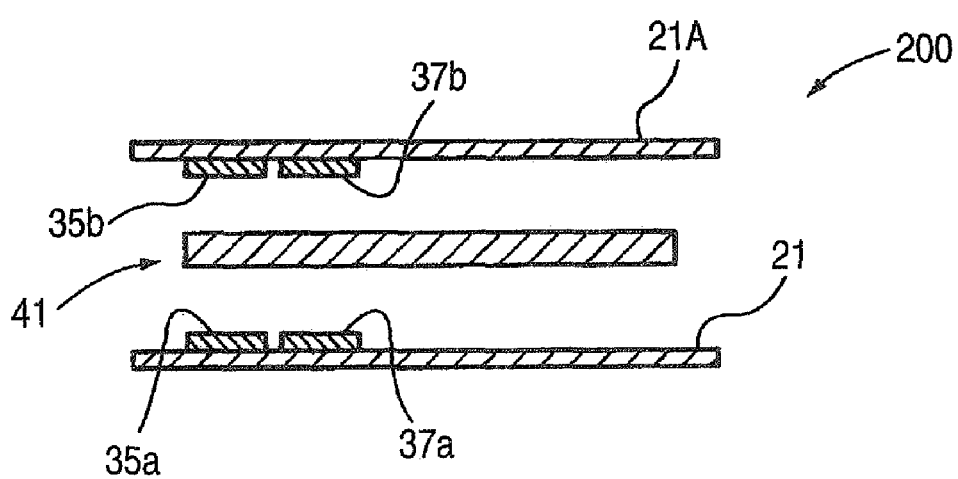

FIGS. 13A to 13B illustrate conceptual views showing a second exemplary embodiment of the small thin film-movable element according to the invention, FIG. 13A is perspective view of an essential portion, and FIG. 13B is a sectional view taken along a line P-P of FIG. 13A.

According to a small thin film-movable element 200 according to the embodiment, one end of the movable portion 27 is supported by and fixed to the board 21 by way of the hinges 29, 29 and the spacers 31, 31. That is, the movable portion 41 is constituted by a shape of a cantilever by constituting a free end by other end thereof. Further, the first address electrode 35a, the first vibration control electrode 37a are provided above the board 21 to be opposed to the free end of the movable portion 41, and the second address electrode 35b, the second vibration control electrode 37b formed at an opposed board 21A are provided on a side opposed to the first address electrode 35a, the first vibration control electrode 37a interposing the movable portion 51.

Also in the small thin film-movable element 200 having such a constitution, either of the vibration control voltages Va2, Vb2 of the above-described respective variations are applied between the first vibration control electrode 37a and the movable portion 41, or between the second vibration control electrode 37b and the movable portion 41, and vibration of the movable portion 41 can actively be reduced. As a result, the switching operation of the small thin film-movable element 200 can be constituted by high speed.

Next, an explanation will be given of a third exemplary embodiment of a small thin film-movable element according to the invention.

FIGS. 14A and 14B illustrate conceptual views showing a third exemplary embodiment of a small thin film-movable element according to the invention.

A small thin film-movable element 300 according to the embodiment is an element of a so-to-speak parallel flat type in which both ends of a movable portion 51 in a flat plate shape having conductivity and flexibility are fixed to an insulting film 53 formed above the board 21 by interposing a predetermined gap 23. The first address electrode 35a is arranged on a lower side of the movable portion 51 by way of the insulting film 53, further, a second address electrode 35b is arranged on an upper side of the movable portion 51 by way of an insulting film 55. That is, the movable portion 51 is constituted by a shape of a both support beam both ends of which are supported between the first address electrode 35a and the second address electrode 35b. Further, pairs of the first vibration control electrodes 37a, the second vibration control electrodes 37b are arranged on respective left and right sides of the first address electrode 35a and the second address electrode 35b.

Also in the small thin film-movable element 300 of the parallel flat plate type, either of the vibration control voltages Va2, Vb2 of respective variations are applied between the first vibration control electrode 37a, 37a and the movable portion 51, or between the second vibration control electrodes 37b, 37b and the movable portion 51, and vibration of the movable portion 51 can actively be reduced. As a result, the switching operation of the small thin film-movable element 300 can be constituted by high speed.

Next, an explanation will be given of a fourth exemplary embodiment of a small thin film-movable element according to the invention.

FIGS. 15A and 15B illustrate conceptual views showing a fourth exemplary embodiment of a small thin film-movable element according to the invention.

According to a small thin film-movable element 400 according to the embodiment, the second drive source (first vibration control electrode 37a, second vibration control electrode 37b) for applying the physical acting force in a direction reverse to the transition direction of the movable portion 27 is arranged on a side opposed to the first drive source (first address electrode 35a and second address electrode 35b) by interposing the movable portion 27.

According to the small thin film-movable element 400, the physical acting force is applied to the first drive source and the movable portion 27, immediately before the movable portion 27 reaches the final position, the physical acting force is applied to the second drive source disposed on a side opposed to the first drive source by interposing the movable portion 27 and the movable portion 27, and a speed at an instance at which the movable portion 27 reaches the finally displaced position is substantially nullified. Thereby, vibration by impact generated when the movable portion 27 of the background art reaches the finally displaced position by the large speed, and when the movable portion 27 reaches the finally displaced position in a case in which the movable portion 27 is driven in noncontact, overshoot is not brought about.

Further, pluralities of the first address electrodes 35a and the second address electrodes 35b, the first vibration control electrodes 37a, the second vibration control electrodes 37b may be arranged as in first address electrodes 35a1, 35a2, second address electrodes 35b1, 35b2, first vibration control electrodes 37a1, 37a2, second vibration control electrodes 37b1, 37b2 of a small thin film-movable element 400A shown in FIG. 15B. That is, at least either one of a first drive source constituted by the first address electrodes 35a1, 35a2, the second address electrodes 35b1, 35b2, and a second drive source constituted by the second vibration control electrodes 37b1, 37b2 is arranged at at least one of installation places for transiting the movable portion 27 in the first direction or the second direction different from the first direction. According to a constitution in which two or more of electrostatic forces can be set in respective transition directions of the movable portion 27 in this way, in the movable portion of a pivoting type constituting a center of rotation by, for example, a center thereof, two or more of electrostatic forces are applied to respective one sides of both sides interposing the center of rotation. Thereby, brake forces having different magnitudes can be applied to one side of the movable portion 27 by different timings and a variety of vibration restraining effects can be achieved.

Next, an explanation will be given of a fifth exemplary embodiment of a small thin film-movable element according to the invention.

FIG. 16 is a plane view showing a fifth exemplary embodiment of applying a small thin film-movable element according to the invention to an RF switch, FIGS. 17A and 17B illustrate explanatory views in which FIG. 17A shows a D-D section of an OFF state of the RF switch shown in FIG. 16 and FIG. 17B shows the D-D section in an ON state, and FIGS. 18A and 18B illustrate explanatory views in which FIG. 18A shows an E-E section of the OFF state of the RF switch shown in FIG. 16 and FIG. 18B showing the E-E section in the ON state.

The RF switch 500 constitutes an RF (radio frequency) switch of a cantilever type. That is, the RF switch 500 includes a cantilever 71 constituting a movable portion arranged in parallel with the board 21 by way of the gap 23, the spacer 31 for supporting a base end of the cantilever 71 by the board 21, the first electrode 35a, the first vibration control electrode 37a, a movable electrode 39, an input terminal 73, an output terminal 75, and a shortcircuit contact 79.

By such a constitution, by applying a voltage between the first address electrode 35a and the movable electrode 39, the cantilever 71 is elastically displaced in an up an down direction by the electrostatic force, the input terminal 73 and the output terminal 75 are opened and closed to thereby realize the RF switch for connecting and switching an RF (high frequency) signal. According to the RF switch 500, for example, signal paths of low frequency and high frequency in transmitting/receiving can be switched by a single switch. Further, contacts constituted by two of the input terminals 73, the output terminal 75 can form a closed circuit by being connected by using one mechanical element. Thereby, both of a series connection mode of connecting a signal path and a shortcircuit mode of grounding the signal path can be realized.

When the constitution of the small thin film-movable element according to the invention is utilized in a switch, a router, an RF signal processing, a function far more excellent than that in a case of using a normal electronic part can be realized. That is, the vibration of the movable portion can actively be reduced and therefore, the switching operation can be constituted by a high speed. Further, transmission loss can be reduced and insulating performance in an OFF state can be promoted. When applied to an inductor or a capacitor, a tuning circuit having a Q value far higher than that in a case of forming by using a normal semiconductor process can be realized. When a band pass filter or a phase shifter is constituted thereby, a function of a high level which exceeds an SAW element and has not been realized can be realized. When a variable capacitance capacitor is constituted, a circuit having a tuning characteristic more proximate to ideal than a varactor and a diode can be realized. Further, an insulting performance in an OFF state is as high as 40 dB or higher, insertion loss in an ON state can be made to be one severalth of 1 dB, different from a diode or an EFT switch, a substantially ideal RF characteristic can be achieved.

Also in the RF switch 500 constituted in this way, after driving to displace the cantilever 71 in the first direction (direction of being proximate to the board 21), during a time period of transiting the cantilever 71 in the second direction (direction of separating from the board 21) different from the first direction, by applying a pulse to the drive source (movable electrode 39, the first vibration control electrode 37a), the electrostatic force is applied to the cantilever 71 in the first direction. That is, after the cantilever 71 is driven to displace in the first direction to reach the final position of the displacement and during a time period in which the cantilever 71 is transiting in the second direction by a repulsive force or an elastic force by being brought into contact with the stopping member, by applying the electrostatic force in the first direction to the cantilever 71, movement of the cantilever 71 which is going to be separated from the final position of the displacement is actively braked. Thereby, the cantilever 71 can be displaced by a low voltage at high speed.

Each of the small thin film-movable elements 100, 200, 300, 400, 500 disclosed in the above-described respective embodiments can constitute small thin film-movable element arrays by being aligned one-dimensionally or two-dimensionally.

According to the small thin film-movable element arrays, the small thin film-movable element 100, 200, 300, 400, 500 capable of carrying out high speed switching operation are arrayed, can be driven by a low voltage at high speed and can be written with the address voltage faster than in the background art.

That is, the individual small thin film-movable elements can be operated at high speed by a necessary minimum electrostatic force, and high speed operation of a total of the array can be executed. Thereby, for example, a photosensitive member can be exposed at high speed, a projector display having a larger number of pixels can be carried out. For example, although high accuracy is requested for an optical switch array for optical communication and therefore, an operational error caused by a variation in individual elements needs to be corrected, according to the small thin film-movable element array, the operational error can easily be corrected by changing voltages applied to the individual small thin film-movable elements in correspondence with the correction.

Further, since high accuracy is requested for the small thin film-movable element array for optical communication, an operational error caused by a variation in individual elements needs to be corrected. Therefore, with regard to the small thin film-movable element array, the correction needs to be carried out for respective elements. In contrast thereto, according to the small thin film-movable element array of the embodiment, by changing displacement control signals of the individual small thin film-movable elements, 100, 200, 300, 400, 500 in correspondence with the correction, the operational error can easily be corrected.

Figure 19:
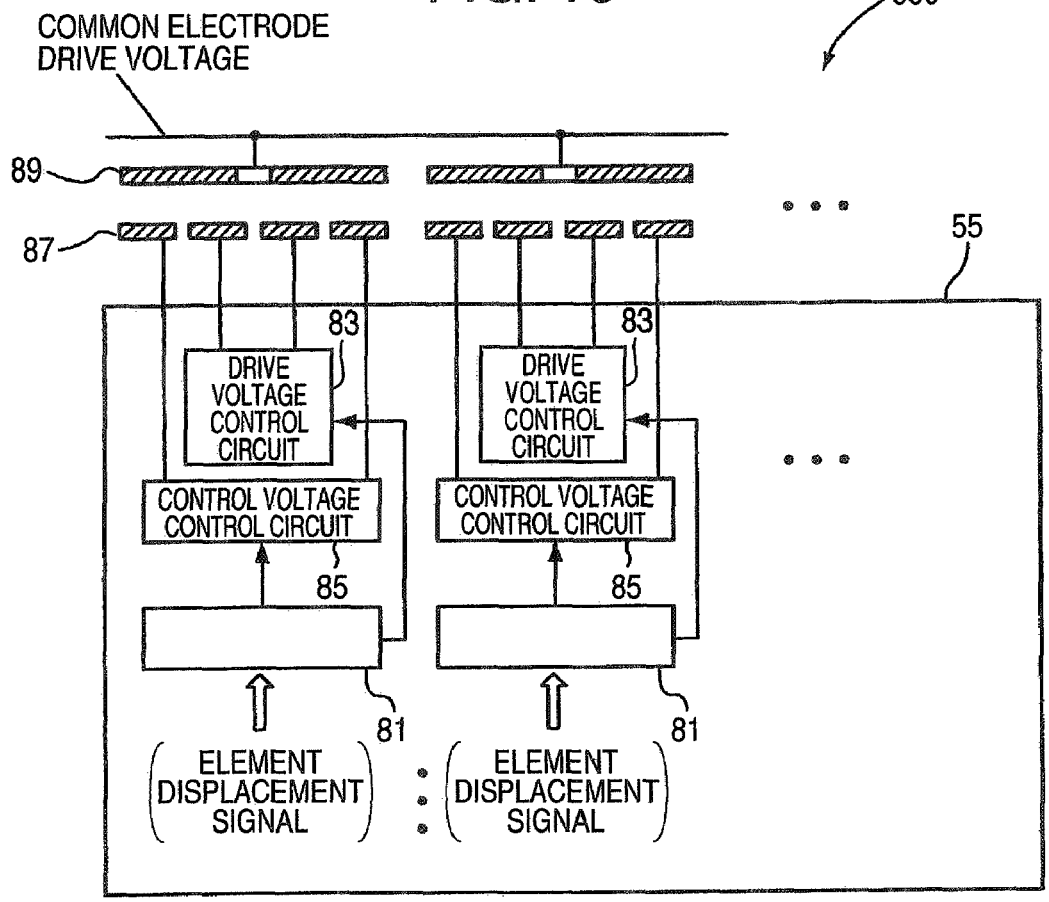
FIG. 19 is an explanatory view showing an exemplary constitution in which each of a small thin film-movable element includes a drive circuit including a memory circuit.

FIG. 19 is an explanatory view showing a constitution in which each of small thin film-movable element includes drive circuits including memory circuits.

According to a small thin film-movable element array 600, it is preferable that each of the small thin film-movable element 100 includes a drive circuit 55 including a memory circuit 81. By providing the memory circuit 81, an element displacement signal can previously be written to the memory circuit 81. The memory circuit 81 is previously written with the element displacement signal. In switching the small thin film-movable element 100, by the element displacing signal stored to the memory circuit 81 of each of the small thin movable elements 100, and a drive voltage control circuit 83 for controlling a voltage applied to the small thin film-movable element 100, a control portion (control voltage control circuit) 85, the displacement control signal, the vibration control signal of the invention are outputted to the signal electrodes (first address electrode, second address electrode, first vibration control electrode, second vibration control electrode) 87 of the small thin film-movable element 100. At this occasion, a desired voltage is also outputted to a common electrode (movable electrode) 89.

In this way, when the small thin film-movable element 100 is driven by using the memory circuit 81, each of the plurality of small thin film-movable elements 100 can easily be operated by an arbitrary drive pattern and can actively be driven at high speed. Further, here, although there has been shown an example of constituting the small thin film-movable element array 600 by using the small thin film-movable element 100 according to the invention, the invention is not limited thereto but may be used in any of the small thin film-movable element 200, 300, 400, 500 by other constitution.

Figure 20:
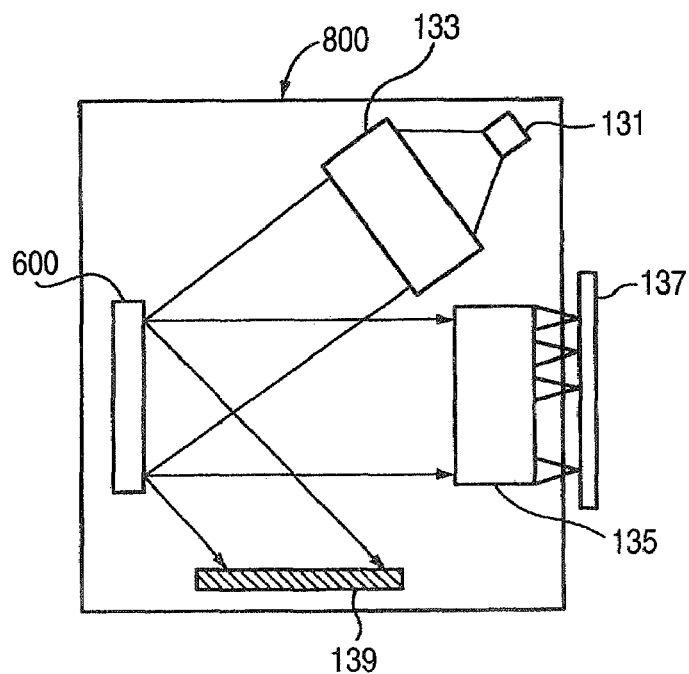
FIG. 20 is a view showing an outline constitution of an exemplary exposing apparatus constituted by using a small thin film-movable element array according to the invention.

Next, an explanation will be given of an image forming apparatus constituted by using the small thin film-movable element array 600. Here, first, an exposing apparatus 800 will be explained as an example of an image forming apparatus. FIG. 20 is a view showing an outline constitution of the exposing apparatus constituted by using the small thin film-movable element array according to the invention. The exposing apparatus 800 includes an illuminating light source 131, an illuminating optical system 133, the small thin film-movable element array 600 aligned with a plurality of the small thin film-movable elements 100 according to the above-described embodiment in a shape of the same flat face and two-dimensionally, and a projecting optical system 135.

The illuminating light source 131 is a light source of a laser, a high pressure mercury lamp, a short arc lamp or the like. The illuminating optical system 133 is a collimating lens for constituting light in a face-like shape emitted from the illuminating light source 131 by parallel light. Parallel light transmitted through the collimating lens is incident orthogonally on the respective small thin film-movable elements 100 of the small thin film-movable element array 600. As means for constituting face-like light emitted from the illuminating light source 131 by parallel light, other than the collimating lens, there is a method of arranging two of micro lenses in series or the like. Further, by using the illuminating light source 131 having a small light emitting point of a short arc lamp or the like, the illuminating light source 131 may be regarded as a point light source and parallel light may be made to be incident on the small thin film-movable element array 600. Further, by using an LED array having LED in correspondence with each of the small thin film-movable elements 100 of the small thin film-movable element array 600 as the illuminating light source 131 and emitting light by making the LED array and the small thin film-movable element array 600 proximate to each other, parallel light may be made to be incident on the respective small thin film-movable elements 100 of the small thin film-movable element array 600. Further, when a laser is used as the illuminating light source 131, the illuminating optical system 133 may be omitted.

The projecting optical system 135 is for projecting light to a record medium 137 constituting an image forming face, and is, for example, a microlens array having microlenses in correspondence with the respective small thin film-movable elements 100 of the small thin film-movable element array 600 or the like.

Operation of the exposing apparatus 800 will be explained as follows.

Face-like light emitted from the illuminating light source 131 is incident on the illuminating optical system 133 and light made to be parallel light thereby is incident on the small thin film-movable element array 600. Light incident on the respective small thin film-movable elements 100 of the small thin movable element array 600 is controlled to be reflected in accordance with image signals. An image of light emitted from the small thin film-movable element array 600 is taken to be exposed at the image forming face of the record medium 137. Image taking light is projected to be exposed while moving in a scanning direction relative to the record medium 137 and can expose a wide area by high resolution. In this way, by providing the collimating lens on a side of an incident face of light of the small thin film-movable element array 600, light incident on a flat face board of each modulating element can be made to be parallel light. Further, numeral 139 in the drawing designates an optical absorber for introducing OFF light.

The exposing apparatus 800 is not limited to use the collimating lens as the illuminating optical system 133 but can be constituted by using a microlens array. In that case, each microlens of the microlens array corresponds to each small thin film-movable element 100 of the small thin movable element array 600 and can be designed and adjusted such that an optical axis and a focal face of the microlens are aligned to a center of each optical modulating element.

In this case, incident light from the illuminating light source 131 is converged to a region having an area smaller than that of one element of the small thin film-movable element 100 by a microlens array and is incident on the small thin film-movable element array 600. Light incident on each small thin film-movable element 100 of the small thin film-movable element array 600 is controlled to be reflected in accordance with the inputted image signal. Light emitted from the small thin film-movable element array 600 is projected to be exposed at the image forming face of the record medium 137 by the projecting optical system 135. Projected light is projected to be exposed while moving in the scanning direction relative to the record medium 137 and can expose a wide area by high resolution. In this way, light from the illuminating light source 131 can be converged by the microlens array and therefore, the exposing apparatus promoting a light utilizing efficiency can be realized.

Further, a shape of a lens face of the microlens is not particularly limited such as a shape of a spherical face, a semispherical shape or the like but may be a shape of a projected curved face or a recessed curved face. Further, the microlens array may be a microlens array of a flat shape having a refractive index distribution, or may be arrayed with Fresnel lenses or a diffractive lens by binary optics. A material of the microlens is, for example, transparent glass or resin. From a view point of mass production performance, resin is excellent, from a view point of service life, reliability, glass is excellent. In an optical view point, quartz glass, melted silica, nonalkali glass or the like is preferable as glass, as resin, acrylic species, epoxy species, polyester species, polycarbonate species, styrene species, vinyl chloride species or the like is preferable. Further, as resin, there are a photo-curing type, a thermoplastic type and the like, which are preferably selected pertinently in accordance with a method of fabricating the microlens.

Next, a projecting apparatus will be explained as other example of an image forming apparatus.

Figure 21:
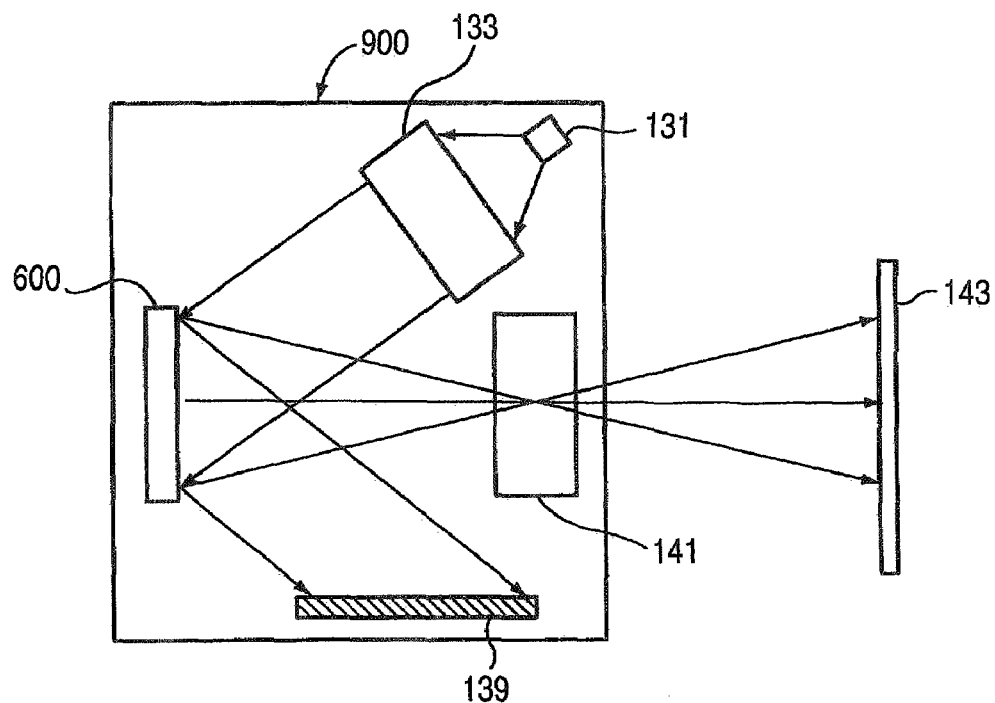
FIG. 21 is a view showing an exemplary outline constitution of a projecting apparatus constituted by using a small thin film-movable element array according to the invention.

FIG. 21 is a view showing an outline constitution of a projecting apparatus constituted by using a small thin film-movable element array according to the invention. Constitutions similar to those of FIG. 20 are attached with the same notations and an explanation thereof will be omitted.

A projector 900 as a projecting apparatus includes the illuminating light source 131, the illuminating optical system 133, the small thin film-movable element array 600, and the projecting optical system 131. The projecting optical system 131 is an optical system for a projecting apparatus for projecting light to a screen 143 constituting an image forming face. The illuminating optical system 133 may be the above-described collimator lens, or may be a microlens array.

Next, operation of the projector 900 will be explained.

Incident light from the illuminating light source 131 is converged to a region having an area smaller than one element of the small thin film-movable element 100 by, for example, a microlens array and is incident on the small thin film-movable element array 600. Light incident on the respective small thin film-movable elements 100 of the small thin film-movable element array 600 is controlled to be reflected in accordance with image signals. Light emitted from the small thin film-movable element array 600 is projected to be exposed at the image forming face of the screen 143 by the projecting optical system 141. In this way, the small thin film-movable element array 600 can also be utilized for the projecting apparatus and is further applicable also to a display apparatus.

Therefore, according to the image forming apparatus of the exposing apparatus 800 or the projector 900 or the like, by providing the small thin film-movable element array 600 at an essential portion of the constitution, the movable portion 27 can be displaced by a low voltage at high speed. Thereby, a photosensitive member can be exposed at high speed and a display of a projector having a larger number of pixels can be executed. Further, according to the image forming apparatus (exposing apparatus 800) in which a gray scale is controlled by making exposing light ON/OFF, by enabling to shorten time periods of ON and OFF, higher gray scale can be realized. As a result, a photosensitive member can be exposed at high speed and display of a projector having a larger number of pixels can be carried out.

Figure 22:
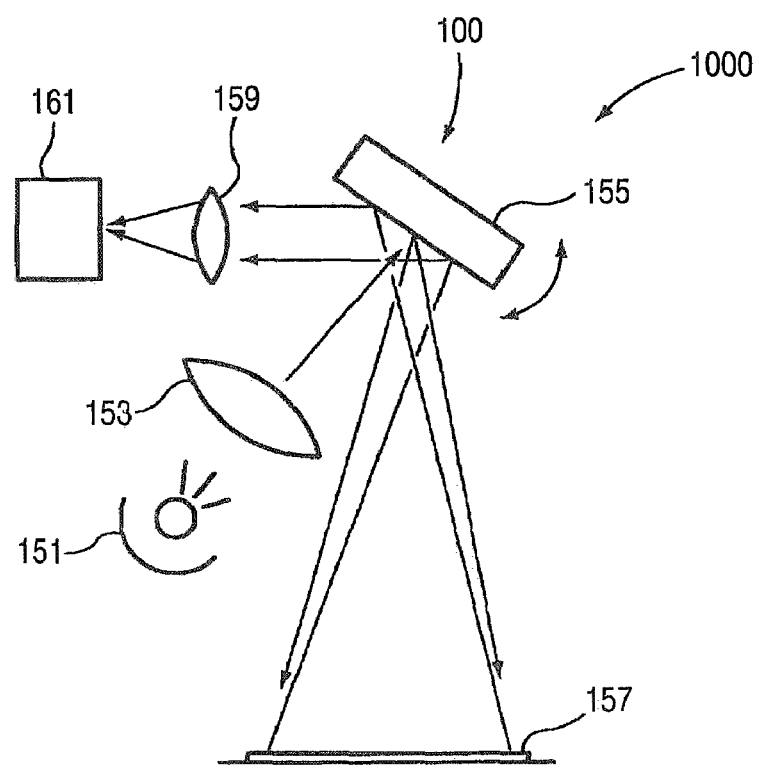
FIG. 22 is a view showing an exemplary outline constitution of a scanner using a small thin film-movable element array according to the invention.

FIG. 22 is a view showing an outline constitution of a scanner using the small thin film-movable element array according to the invention.

The small thin film-movable element array according to the invention can preferably be used also for a beam scanner or the like for scanning light ray emitted from a light emitting element to an irradiated object and reflecting light returned from the irradiated object to be incident on a light receiving element. A scanner 1000 narrows light from a light source 151 by a lens 153, reflects the light by a scan mirror 155 constituting the movable portion of the small thin film-movable element 100 to be irradiated to a bar code 157. The scan mirror 155 is pivoted for irradiating light over an entire region of the bar code 157. In pivoting, the movable portion is pivoted to displace by constituting a center of twist by a hinge by applying voltages to a first electrode, a second electrode, the movable portion, a first vibration control electrode, a second vibration control electrode, not illustrated. That is, by constituting the movable portion by the scan mirror 155, a direction of reflecting light is switched.

On the other hand, light irradiated to a face of the bar code 157 returns again to the scan mirror 155 with a change in a light amount by black and white of the bar code while being randomly reflected, light reflected thereby is converged by a converging lens 159 and a change in the light amount by a light receiving element 161 is electrically converted to be outputted. Further, in order to promote reading accuracy, by providing a band pass filter (BPF) at a front face of the light receiving element 161, unnecessary light other than a frequency of emitted light is prevented from being adopted.

Also in the scanner 1000 using the small thin film-movable element array 600 comprising the small thin film-movable element 100, the scan mirror 155 can be displaced at high speed by actively reducing vibration of the scan mirror 155.

Figure 23:
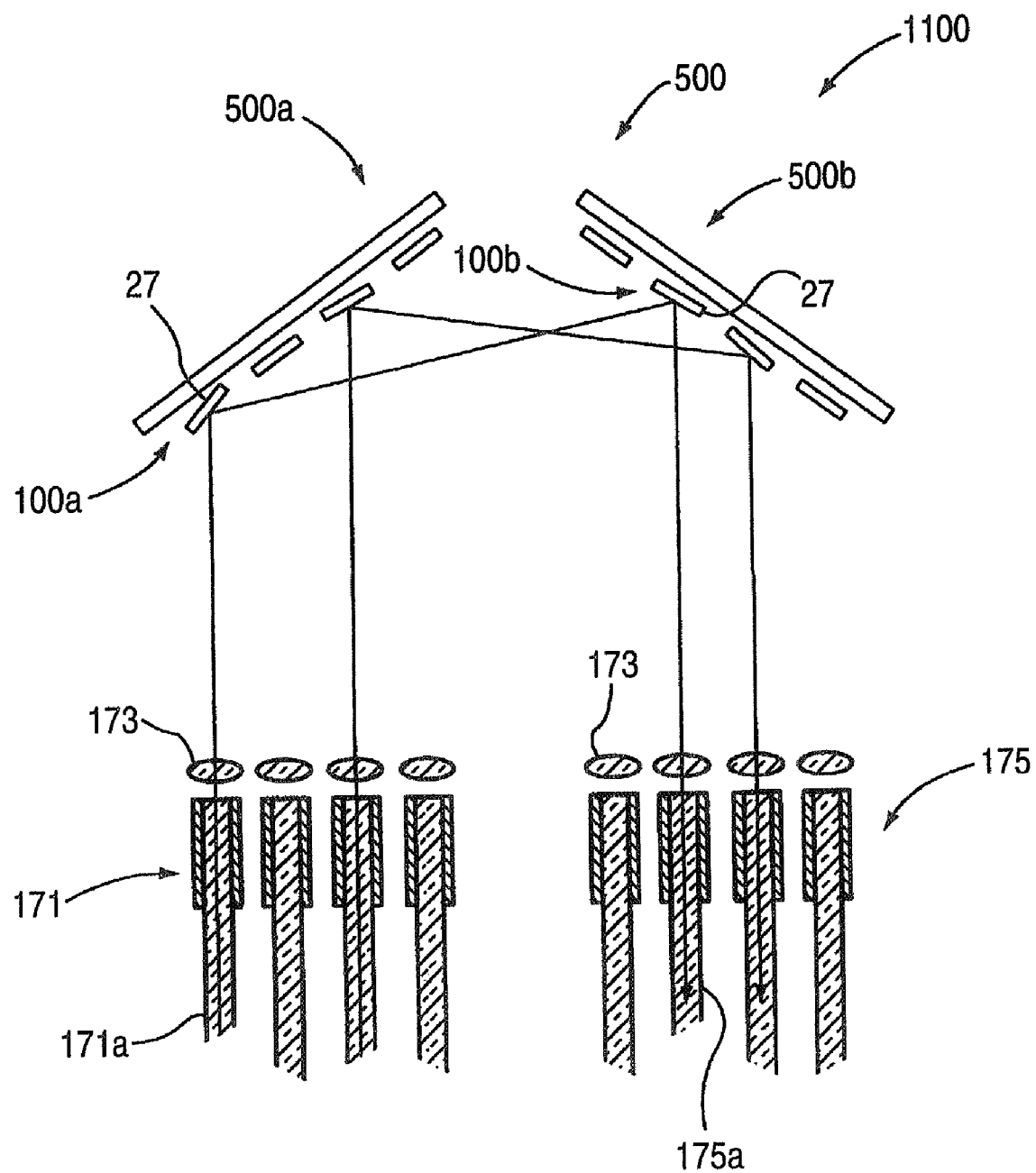
FIG. 23 is an explanatory view showing an exemplary constitution of a cross connect switch using a small thin film-movable element array according to the invention.
Figure 24B:
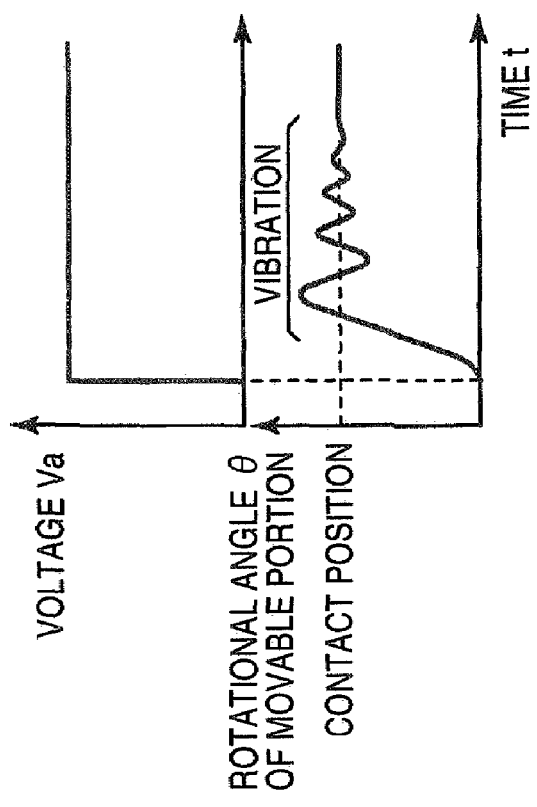
FIGS. 24A and 24B illustrate explanatory views showing a vibration of a movable portion generated at a small electromechanical modulating element of a background art.
Figure 24A:
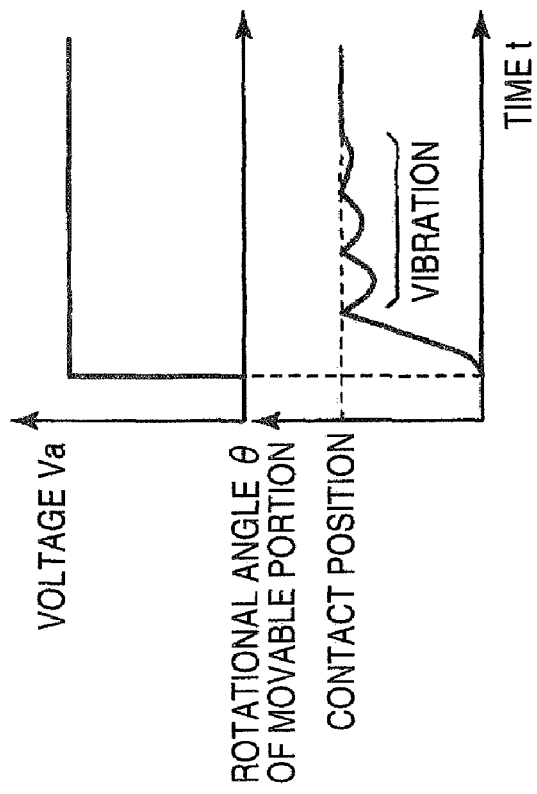
Figure 25A:
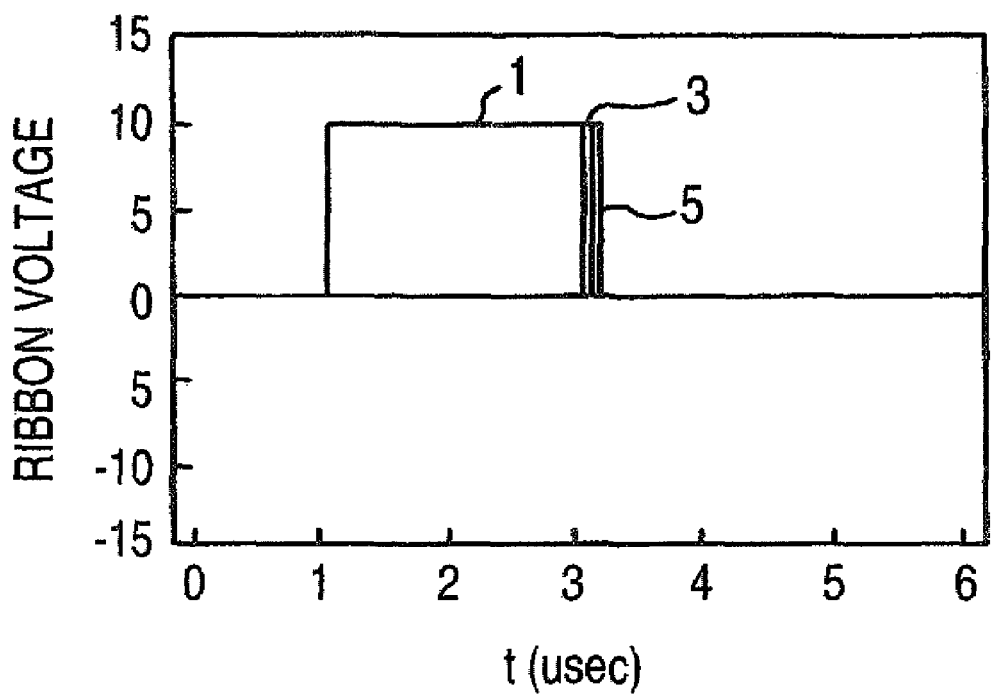
FIGS. 25A and 25B illustrate explanatory views of a brake pulse applied in a small mechanical lattice apparatus of a background art.
Figure 25B:
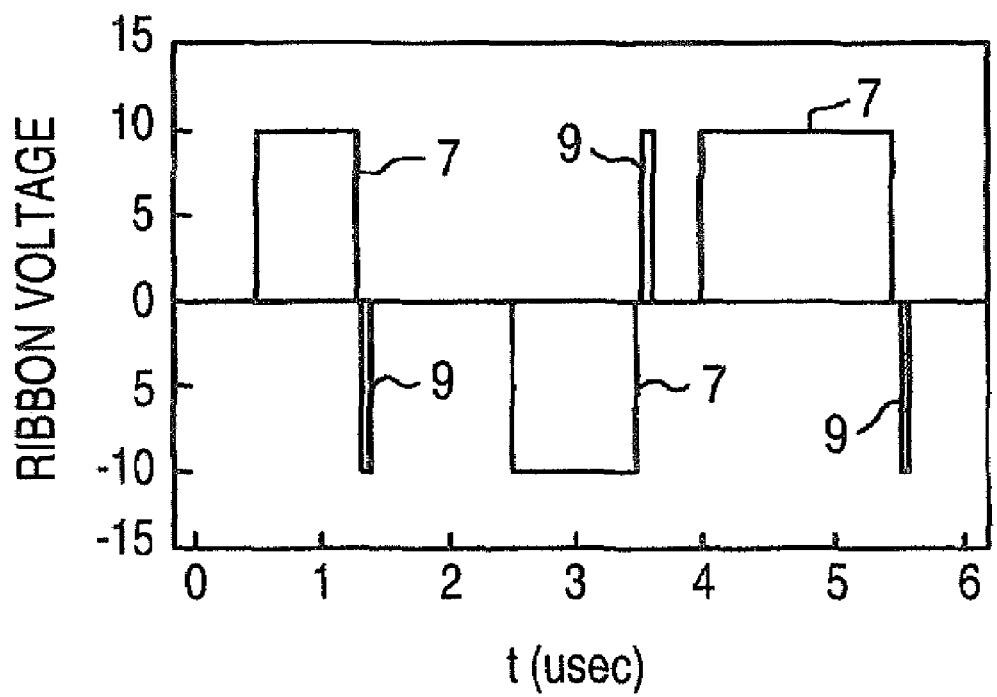
Figure 26A:
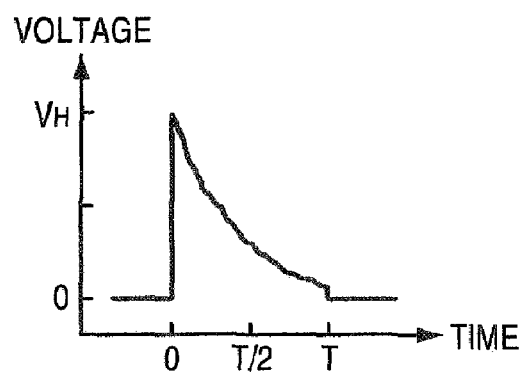
FIGS. 26A to 26D illustrate explanatory views of a signal voltage waveform applied in an optical path switching apparatus of a background art.
Figure 26B:
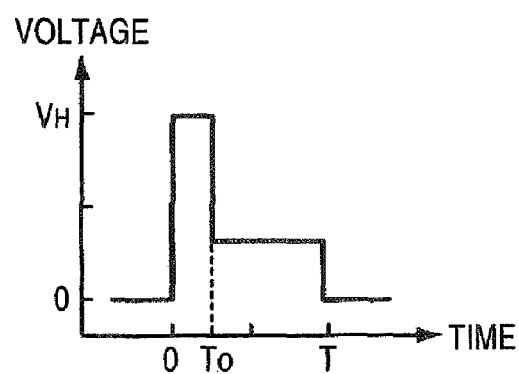
Figure 26C:
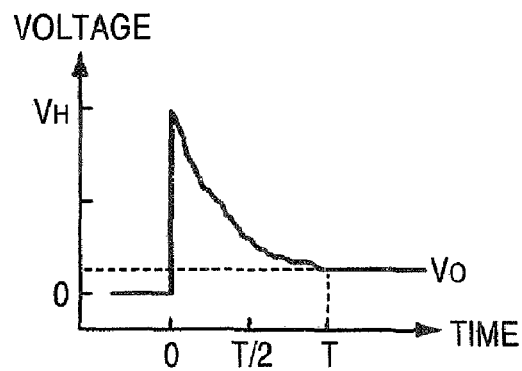
Figure 26D:
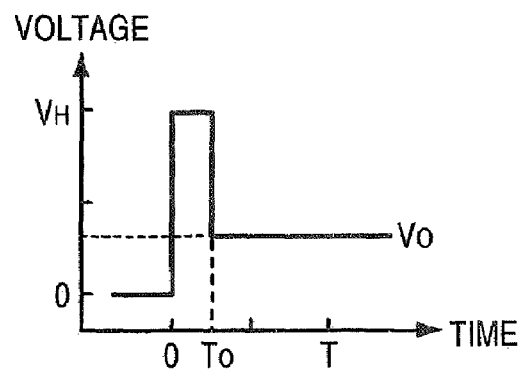
Figure 29:
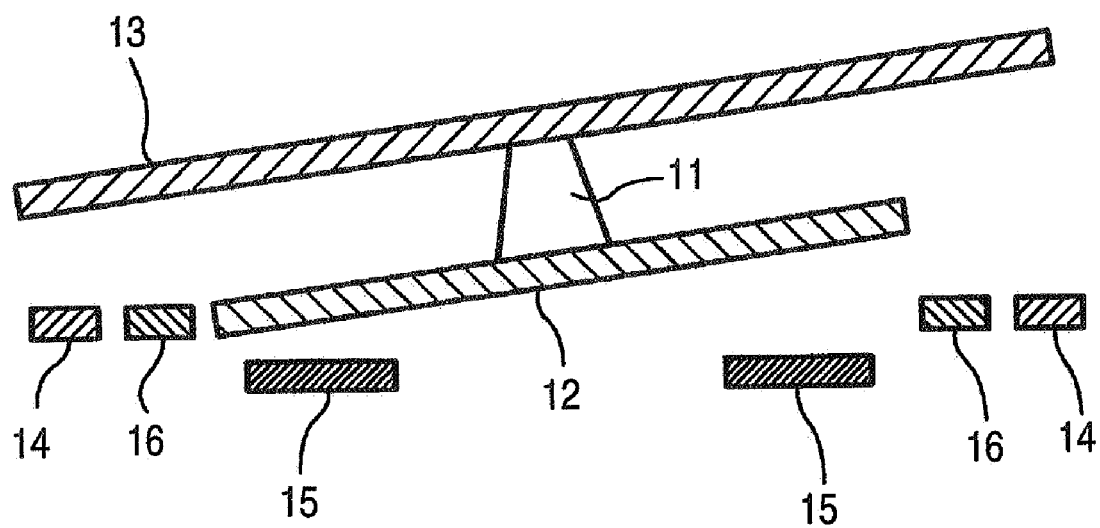
FIG. 29 is an outline constitution view of a small electromechanical modulating element of a background art including a catch electrode.

FIG. 23 is an explanatory view showing a constitution of a cross connect switch using the small thin film-movable element array according to the invention.

Further, the small thin film-movable element array 600 according to the invention can preferably be used for a cross connect switch of optical communication or the like. The cross connect switch 1100 can be constituted by using the small thin film-movable element array 600 one-dimensionally aligned with, for example, the small thin film-movable element 100. In the illustrated example, two of small thin film-movable element arrays 600a, 600b are provided. According to the cross connect switch 1100, emitted light from an optical fiber 171a of an input fiber port 171 passes through a microlens 173 and is incident on a predetermined one of the small thin film-movable element 100a of the small thin film-movable element array 600a on one side. Incident light becomes reflected light by switching operation of the small thin film-movable element 100a to be incident on a desired small thin film-movable element 100b of the incident side small thin film-movable element array 600b. Incident light is incident on an optical fiber 175a of a predetermined output fiber port 175 by switching the small thin film-movable element 100b.

Also in the cross connect switch 1100, by using the small thin film-movable element array 600 comprising the plurality of small thin film-movable elements 100, the movable portion 27 can be displaced at high speed. As a result, noise is reduced by reducing chattering and switching operation can be constituted by high speed.

Further, according to the cross connect switch 1100, by changing voltages applied to the individual small thin film-movable elements 100 as described above, the operational error can easily be corrected and therefore, the operational error caused by a variation in the individual small thin film-movable elements 100 can simply be corrected and high accuracy switching can be carried out.

Further, although according to the cross connect switch 1100, an explanation has been given by taking an example of using the small thin film-movable element 100 which is monoaxially pivoted, a three-dimensional thin film movable element which is pivoted biaxially may be used for the small thin film-movable element array. By constituting in this way, even when, for example, the optical fibers 171a of the inputted fiber ports 171 are one-dimensionally aligned and the optical fibers 175a of the output fiber ports 175 are two-dimensionally aligned, by three-dimensionally driving the movable portion 27, emitted light from the optical fiber 175a can also be switched to a desired one of the optical fiber 175a in a direction orthogonal to a paper face.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-200367 filed Jul. 8, 2005, the contents of which are incorporated herein by reference.

What is claimed is:

1. A small thin film-movable element comprising:
a movable portion elastically deformably supported and capable of being displaced in a first direction and a second direction reverse to the first direction;
a first drive source that applies a physical acting force to the movable portion so that the movable portion performs a modulating or switching function by the first drive source; and
a second drive source different from the first drive source, the second drive source increasing or reducing an absolute value of the physical acting force to restrain a vibration of the movable portion when the first drive source drives the movable portion to be displaced in the first direction,
wherein the physical acting force from the first drive source, which is applied by an electrostatic force, causes a rotational displacement of the movable portion in the first and the second directions.

2. The small thin film-movable element according to claim 1, wherein after the movable portion is driven to be displaced in the first direction, the second drive source applies a physical acting force to the movable portion moving in the second direction.

3. The small thin film-movable element according to claim 1, wherein the physical acting force is applied to a plurality of points of action in the movable portion.

4. The small thin film-movable element according to claim 1, wherein a speed of the movable portion is substantially nullified when the movable portion reaches a final position of a displacement in one of the first and second directions.

5. The small thin film-movable element according to claim 1, wherein the physical acting force is an electrostatic force.

6. The small thin film-movable element according to claim 1, wherein the physical acting force is applied in a shape of a pulse waveform expressed in an ordinate by an intensity of the physical acting force and an abscissa by time.

7. The small thin film-movable element according to claim 6, wherein the physical acting force is generated by a plurality of pulse waveforms.

8. The small thin film-movable element according to claim 1, wherein two or more of physical acting forces can be set in each of the first and second directions.

9. The small thin film-movable element according to claim 1, wherein when the movable portion reaches a final position of a displacement in one of the first and second directions, the movable portion is stopped by being brought into contact with a stopping member.

10. The small thin film-movable element according to claim 1, wherein the second drive source applying a physical acting force in a direction reverse to a transition direction of the movable portion is arranged on a side opposed to the first drive source by interposing the movable portion between the first and second drive sources.

11. The small thin film-movable element according to claim 1, wherein at least one of the first and second drive sources is arranged at a place for moving the movable portion in one of the first and second directions.

12. The small thin film-movable element according to claim 1, wherein the movable portion performs a switching function for optical communication to switch from output light of a first optical fiber to that of a second optical fiber.

13. A small thin film-movable element array comprising a plurality of movable elements one-dimensionally or two-dimensionally arranged, the plurality of movable elements comprising a small thin film-movable element according to claim 1.

14. The small thin film-movable element array according to claim 13,
wherein each of the movable elements comprises a drive circuit including a memory circuit and at least two fixed portions opposed to the movable portion; and
wherein the movable portion includes a first electrode and the at least two fixed portions include a second electrode, one of the first and second electrodes is a signal electrode inputted with an element displacement signal from the drive circuit, and the other of the first and second electrodes is a common electrode.

15. The small thin film-movable element array according to claim 13, further comprising a control portion that drives to modulate the movable portion in each of the movable elements.

16. An image forming apparatus comprising:
a light source;
a small thin film-movable element array according to claim 13;
an illuminating optical system that irradiates light from the light source to the small thin film-movable element array; and
a projecting optical system that projects light emitted from the small thin film-movable element array to an image forming face.

* * * * *